United States Patent [19]

Stern et al.

[11] 4,367,557
[45] Jan. 4, 1983

[54] WIRED BROADCASTING SYSTEMS

[76] Inventors: Joseph L. Stern, 45 Windsor Rd., Great Neck, N.Y. 11021; Joseph Garodnick, 1 Wall St., Fort Lee, N.J. 07024

[21] Appl. No.: 42,524

[22] Filed: May 25, 1979

Related U.S. Application Data

[63] Continuation of Ser. No. 709,002, Jul. 26, 1976, abandoned.

[51] Int. Cl.³ ............................................... H04B 3/54
[52] U.S. Cl. .......................................... 455/4; 455/70; 340/310 R; 340/825.71; 358/86
[58] Field of Search ...................... 455/3, 4, 5, 6, 68, 455/70, 127, 343; 358/86, 114, 122; 340/534, 538, 310 R, 310 A, 825.06, 825.07, 825.52, 825.54, 825.56, 825.71

[56] References Cited

U.S. PATENT DOCUMENTS

| | | | |
|---|---|---|---|
| 3,729,710 | 4/1973 | Sherwin | 340/825.71 |
| 3,733,430 | 5/1973 | Thompson | 455/4 |
| 3,828,313 | 8/1974 | Schull et al. | 370/100 |
| 3,943,447 | 3/1976 | Shomo | 455/6 |
| 3,987,240 | 10/1976 | Schultz | 455/6 |
| 3,993,955 | 11/1976 | Belcher | 455/4 |
| 4,007,458 | 2/1977 | Hollabaugh | 340/310 R |
| 4,035,838 | 7/1977 | Bassani | 455/4 |
| 4,039,954 | 8/1977 | Den Toonder | 455/4 |

FOREIGN PATENT DOCUMENTS

| | | |
|---|---|---|
| 2310885 | 2/1973 | Fed. Rep. of Germany . |
| 2350288 | 10/1973 | Fed. Rep. of Germany . |
| 2120024 | 8/1972 | France . |
| 1507859 | 4/1978 | United Kingdom . |

*Primary Examiner*—Tommy P. Chin
*Attorney, Agent, or Firm*—Darby & Darby

[57] ABSTRACT

Subscriber access to the television transmissions of a cable TV system or other wired program transmission is governed by switching means in the remotely controlled unit to which the subscriber's receiver is connected, which switching means is enabled or disabled in response to information coded on the power flow which energizes the controlled unit. The power to the controlled unit may be coded at the cable TV power supply in response to a separate modulated RF carrier signal transmitted to all power supply units from the cable television broadcast central station, or other central location. Stated in other words, a program control center generates binary coded instructions including address words which are conveyed in a wired signal transmission system to multiple subscriber stations by encoding in a special way the output of a power supply used to supply energization to portions of the system. Upon comparison of the addresses, each station addressed is directed remotely by the coded instructions to achieve any of a plurality of switching functions, including the selective connection of program materials to the subscriber's outlet.

28 Claims, 14 Drawing Figures

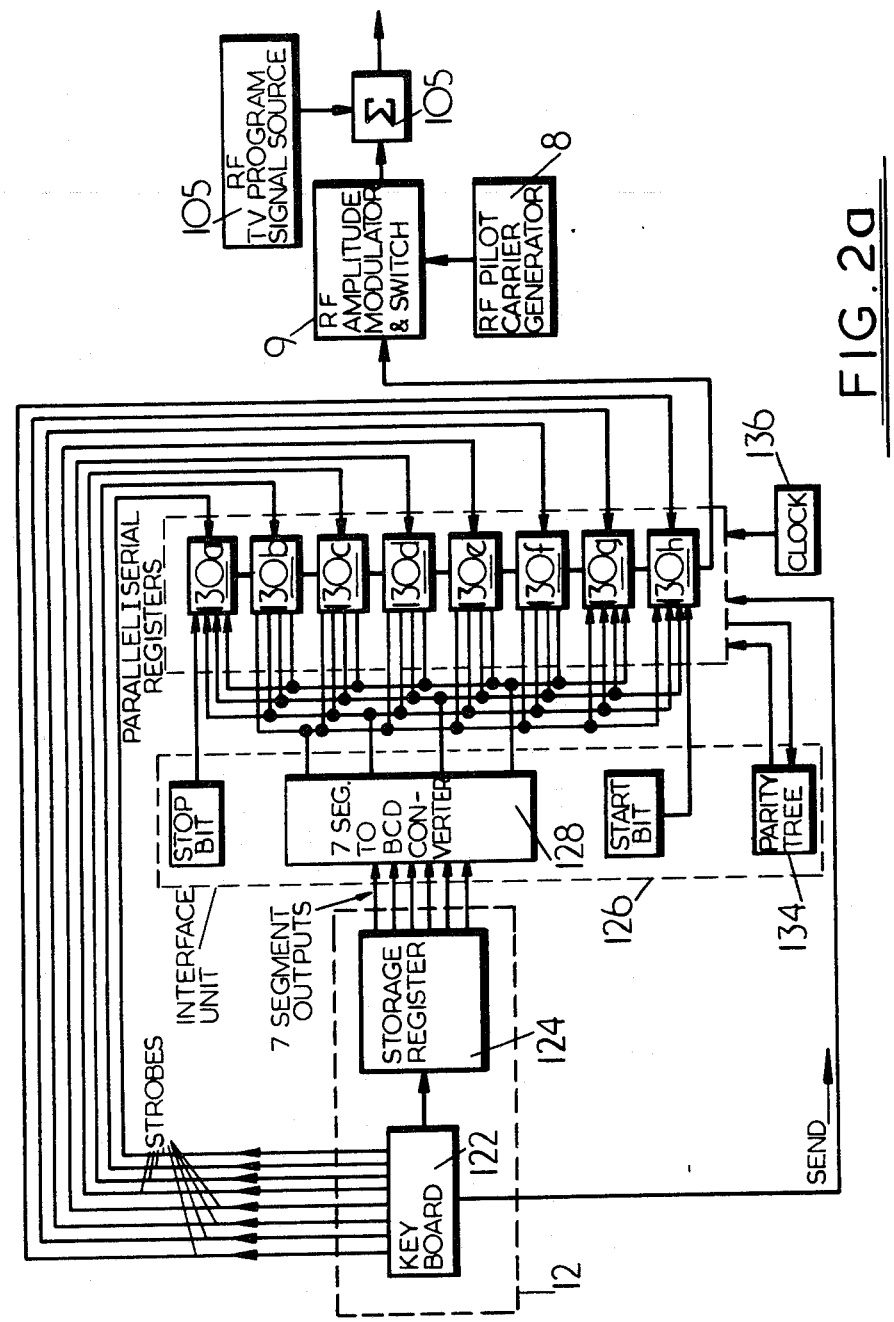

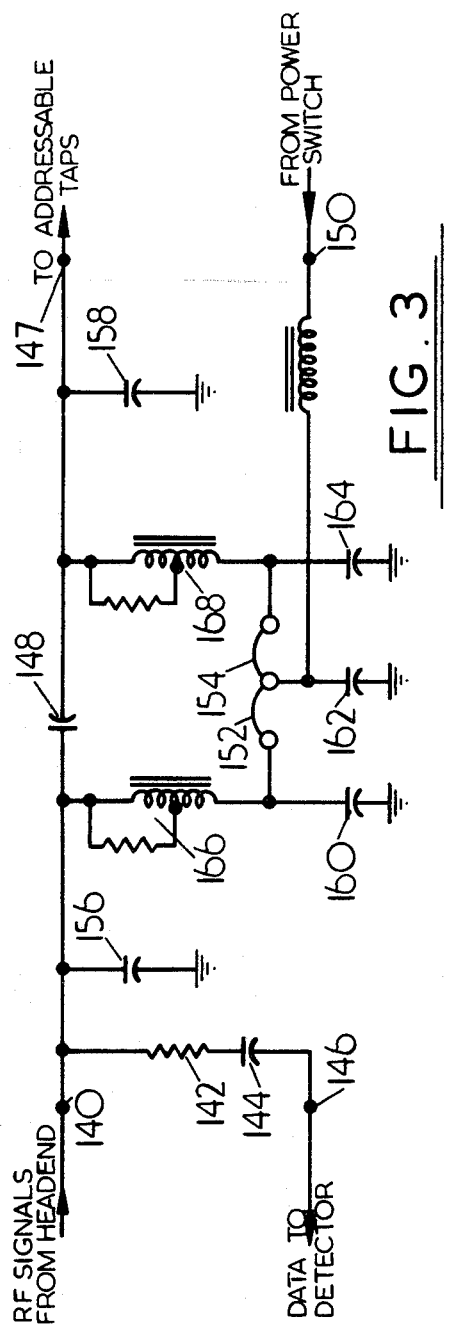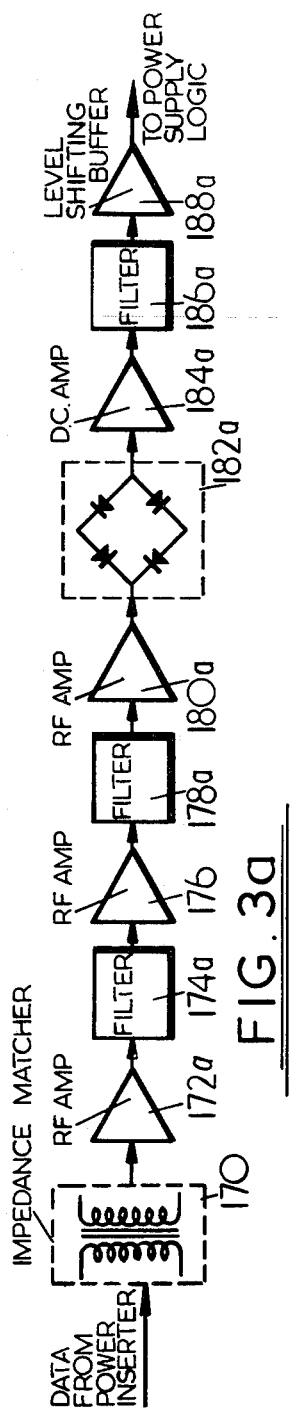

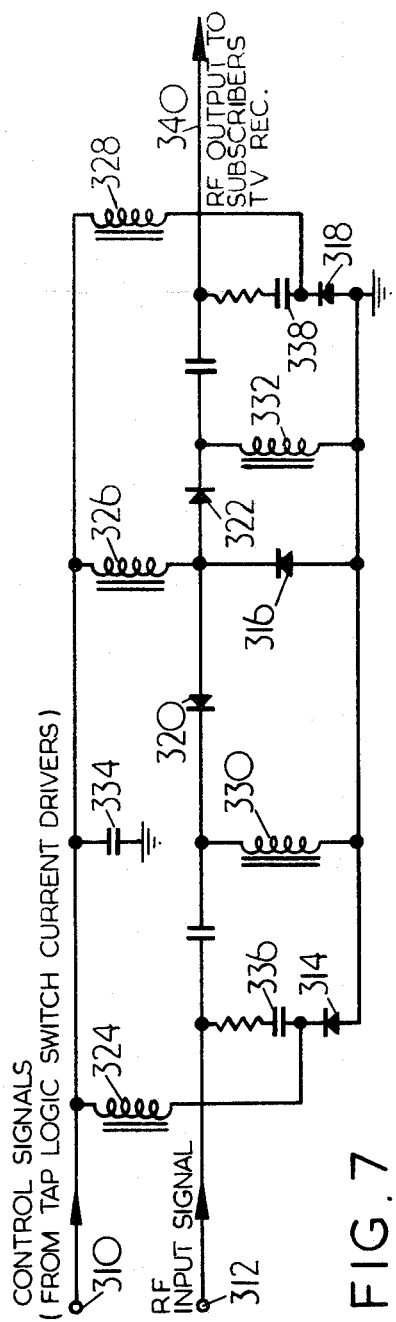
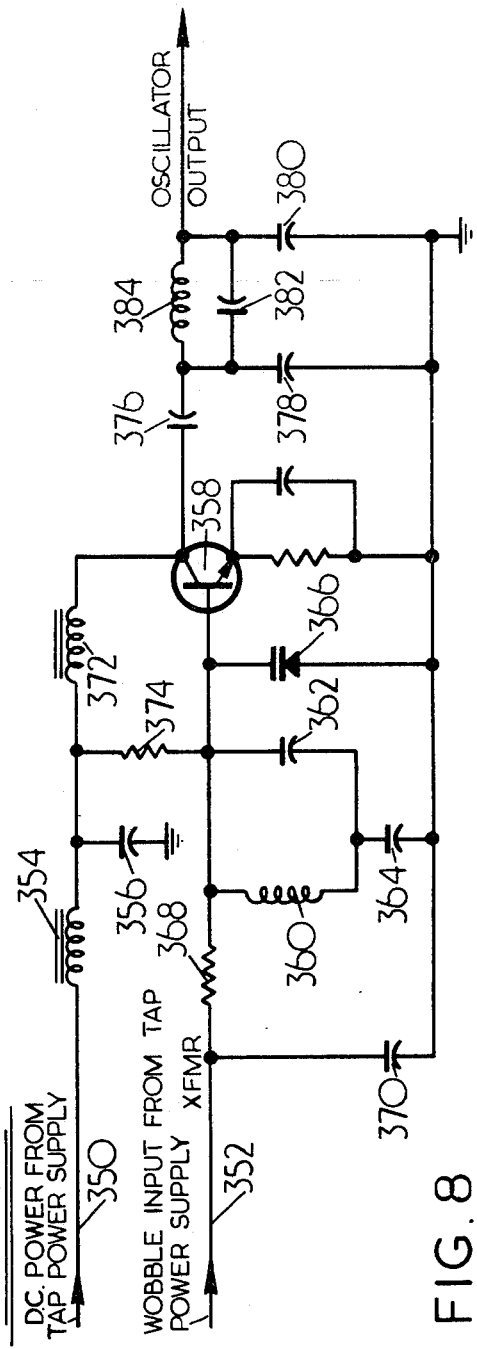
FIG. 7
FIG. 8

WIRED BROADCASTING SYSTEMS

This is a continuation of application Ser. No. 709,002, filed July 26, 1976, now abandoned.

This invention relates to wired signal transmission systems and more particularly it relates to an arrangement for encoding power flow for the remote control of a subscriber's TV signals from a control center or other purposes.

BACKGROUND OF THE INVENTION

Present cable TV systems generally transmit off the air television broadcasts or other programs to subscribers who pay for the privilege of receiving the programs. Within this field, there has long been a need for a cost-effective method of controlling access to the cable system. At the present time, particularly in a dedicated system where taps for connecting subscribers to the system are installed during initial construction, a technician is sent to a subscriber location and utilizes a lift-truck while either connecting a subscriber's lead-in cable to a tap port, or disconnecting the subscriber's cable from the port. It is obvious that a method for providing such an action from a central office or control center would save considerable time and money, and also improve the flexibility of the system generally. A suitable remote control system would permit not only control of a subscriber's access to the system as a whole, but might also allow for partial access to the system on a time basis, an individual channel basis, or both. Thus, a subscriber might be permitted to view none, one, several or all of the available channels of programming. Furthermore, the subscriber might be permitted to view one or more specific channels only at specific times depending upon the terms of his subscription.

In addition to the advantages such a system can provide for the control of basic services, it would be of even greater advantage in the control of pay-TV services. For example, in some pay television systems contemplated by the present art, it is proposed that coin boxes or other receptacles suitable for receiving payment from a subscriber for viewing a particular television program be installed on the subscriber's television receiver. Upon deposit by the subscriber of required payment into the payment receptacle, a switch located adjacent the receptacle or television receiver would be actuated whereby viewing of the desired program would be permitted. In order for the sponsor of the pay TV service to collect its revenues it, too, would be required to dispatch an individual to the subscriber's location to empty the payment receptacle. Enterprising subscribers may, through the use of jumper wires, be able to bypass the payment receptacle in order to view the desired program without making the required payment. Bypass is also possible where purchased tickets or other buying means are needed to actuate the subscription channels.

It would be desirable to avoid these difficulties by permitting the system management to provide or deny pay-TV or special channel services on a remote control basis. Remote control of the provision of pay-TV service on one or more channels would also be desirable to permit a multilevel operation of these channels. As an example, it would be useful to provide that a channel dedicated to pay-TV could be sold at one level of programming (i.e., fee) in the morning, at a second level at midday, and a third level in the evening, and to allow the system operator at the program center to turn on or turn off subscribers who are buying or not buying that particular level of service. In addition access to individual programs could be controlled.

Still another remote control operation that is desirable, among others, is the remote energizing of a transponder device which may very well take signals from a store which serves as a memory for actions in the subscriber location, in a section of the cable system, in a nearby amplifier or in a host of other potential locations where remote status indication is of importance.

One approach to remote control of a subscriber location has been in essence to provide a duplicate of an RF paging system, requiring transmission of special control signals below 300 khz transmitted in addition to programs and power, but with some switches in place of the conventional "beeper" or tone oscillator plus speaker. This is a complex system and extremely expensive to implement, particularly for use in an outdoor environment. The provision, installation and operation of the many required RF receivers makes this system fail to meet the need for a cost-effective remote control cable TV network.

SUMMARY OF THE INVENTION

The present invention meets these objectives and overcomes shortcomings of the prior art in providing a cable or wired transmission system in which subscriber access is controlled in response to coding of the power being transmitted in the system for normal energization of portions of the system, such as repeaters or amplifiers.

A coaxial cable, as used in cable TV systems generally has two separate bands of transmissions. One permits power to be carried in the system, to provide energy for trunk and distribution amplifiers along the system. The other band permits the transmission of the RF program signals. In conventional systems, separate portions of the system, such as individual trunks or groups of subscriber stations, may be powered by respective power supply units, each energizing a section of the system allocated to a particular set of stations.

To utilize to the fullest extent the already existing systems, the present invention provides an arrangement by which special subscriber connection devices (taps) are provided, each for coupling a small number (e.g., four) of subscribers to the cable system. Each tap served from any one power supply unit is given an individual address code, and when properly addressed will actuate any one or more functions for the particular subscriber, such as connecting or disconnecting the subscriber from the cable or jamming his signal, either on an individual channel basis or completely, or even for a predetermined time interval. The same power supply unit will supply energy for controlling the various modes of subscriber access to the system as well as energy for other electrical devices serving the taps, such as repeater or distribution amplifiers.

To accomplish this, the required power produced at the power supply unit is specially coded in accordance with tap-address and control signals.

In order to have the multiplicity of power supply units provide this coded power flow, each power unit is may also be allocated a power unit address code, and the coding of its power for actuating the required taps may be appropriately controlled from the central control point ("head end"), as in response to a modulated RF carrier upon which both the power unit address, the tap or subscriber address, and subscriber status information is encoded. As a further economy in the system, the RF carrier used may be a pilot-frequency carrier already utilized in the system, as for amplifier gain or level control purposes.

The RF carrier signal transmitted from the central station may be serially modulated with data defining the desired control functions relevant to a subscriber and the address of the subscriber's tap and of the power supply unit serving the tap. The modulated RF carrier may be transmitted to all of the power supply units in parallel. Each power supply unit generates power at a quiescent frequency while decoding the data transmitted on the received RF carrier. When the address contained in a particular data word matches that of the respective power supply unit, the power output of the power supply unit is coded in accordance with the subscriber tap address and instruction data of that word encoded on the RF carrier to further transmit or relay that data to all of the subscriber taps served by that power unit. The power transmissions received at all the subscriber taps are continuously decoded. When the tap address encoded on the power transmission corresponds to that preset in a tap, the subscriber tap port control function apparatus for that tap is actuated in accordance with the information relayed through the power transmission. In effect, the system can be thought of as being powered by data which is arranged to control remote components in the system.

The present invention thus provides a wired program disseminating system comprising a plurality of active elements, at least one power supply unit for supplying AC power transmission to the active elements, means for coding the powering, particularly as to frequency, and means for controlling the operation of component parts of the system in dependence upon the coding of the power.

It is therefore an object of this invention to provide apparatus and a method for an improved wired broadcasting system in which the subscriber stations may be remotely controlled from a central program exchange.

An additional object of the invention is to provide a system apparatus and a method for encoding power flow useful with connection or disconnection of a remote subscriber by instructions transmitted from a program control center.

Another object of the invention is to provide a cable TV system wherein control of subscriber access is economically achieved by coding the power transmitted to energize operation of the subscriber taps.

Still another object of the invention is to transmit subscriber access data to the power supply unit associated with each respective subscriber tap by means of a readily available RF pilot carrier signal.

An added object of the invention is to provide remote control switching equipment at or adjacent subscriber's stations addressable to each specific subscriber station from a central program control facility.

Another object of the invention is to provide apparatus and a method of encoding and decoding power flow useful in a system using conventional program distribution facilities for carrying coded messages to address the subscriber control stations.

A further object of the invention is to provide a cable TV system wherein subscriber access to some, as well as all, of the available TV transmission channels may be remotely controlled from a central station.

Still a further object of the invention is to provide a cable TV system wherein all or part of an individual subscriber's access may be remotely controlled in accordance with a time schedule.

Other and further objects of the invention will be apparent from the following drawings and description of a preferred embodiment in which like reference numerals are used to indicate like parts in the various views.

DESCRIPTION OF THE DRAWINGS

FIG. 2A is a schematic diagram partly in block form of the head end encoder of a preferred embodiment of the invention FIG. 3 is a schematic diagram of a power inserter and RF tap for the power supply of the preferred embodiment of the invention.

FIG. 3A is a block diagram of a carrier receiver/detector useful with the preferred embodiment of the invention.

FIG. 7 is a schematic diagram of a switch used to control access of a subscriber to basic service and pay service with the preferred embodiment of the invention.

FIG. 8 is a schematic diagram of a jamming oscillator.

DESCRIPTION OF THE PREFERRED EMBODIMENT

Figure 1:
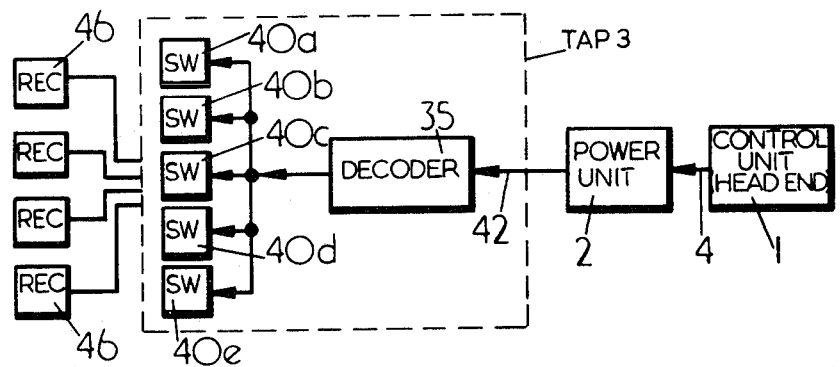
FIG. 1 is a basic block diagram showing the general flow of signals from the head end to the subscriber function control switches in a cable TV system incorporating the invention.

Referring now to FIG. 1, the control system is shown in general block diagram form to illustrate the manner of communicating control signals between a control center or head end 1 and a plurality of subscriber function control switches 40a-c through a wired network of cables 4 which will pass both low frequency power signals (in a range from 50 Hz to 50 khz for example) and high frequency program signals (such as radio and television programs in a range above 100 khz for example). The control signals in passing from control center 1 over cable 4 to one or more remote power supply units 2 may be carried as modulation on RF carrier frequencies. Each power supply unit is preferably a pre-existing unit for supplying necessary power, such as to repeater amplifiers, in the cable system, and adapted according to this invention to provide control signals for determining the functioning of the control switches 40a-c. This invention relates primarily to control signals, the path of program signals being conventional and within the province of those skilled in the art, as exemplified for example in U.S. Pat. Nos. 3,423,521 and 3,922,482.

Simplified equipment is afforded by this invention over known type of addressable paging receivers and decoders operating with radio frequency and tone signals to select one of a plurality of stations for a transmission, where both transmitting and receiving circuits are of necessity complex. This simplification is accomplished by coding the power transmission from power supply units 2 with control codes to transmit commands to addressable tap units 3 over cable 42. A number of taps 3 may be serially connected along a single line if desired. Thus each control center can program a plurality of power supply units 2 and each power supply unit can in turn transmit commands to a plurality of addressable tap units 3, each tap unit serving one or more subscribers. Each tap 3 includes a decoder unit 35, the output of which determines the operation of switches 40a-c which control the functioning of a local program display apparatus 46 such as a television receiver.

Each power supply unit is controlled to provide under command of the control center 1 power of either 60 Hz or 120 Hz on output cables 42. The code for example can comprise a sequence of single cycle "0" or "1" bits. In each addressable tap 3, a 120 Hz cycle is decoded as a logical "0" and a 60 Hz cycle as a logical "1" to thereby provide a digital control signal at decoder 35. While it is preferable that the full cycles of encoded power representing the data bits have a frequency relation of 2 to 1, this may be modified to provide cycles of different frequencies, such as 3 to 1 or even non-integrally related, but with substantially different durations. Thus each subscriber may be addressed separately from a control center for controlling a plurality of selected functions at the subscriber station by operating those control switches 40a-c. Accordingly, complex RF and tone receivers and detectors are not required at the subscriber locations.

Figure 1A:
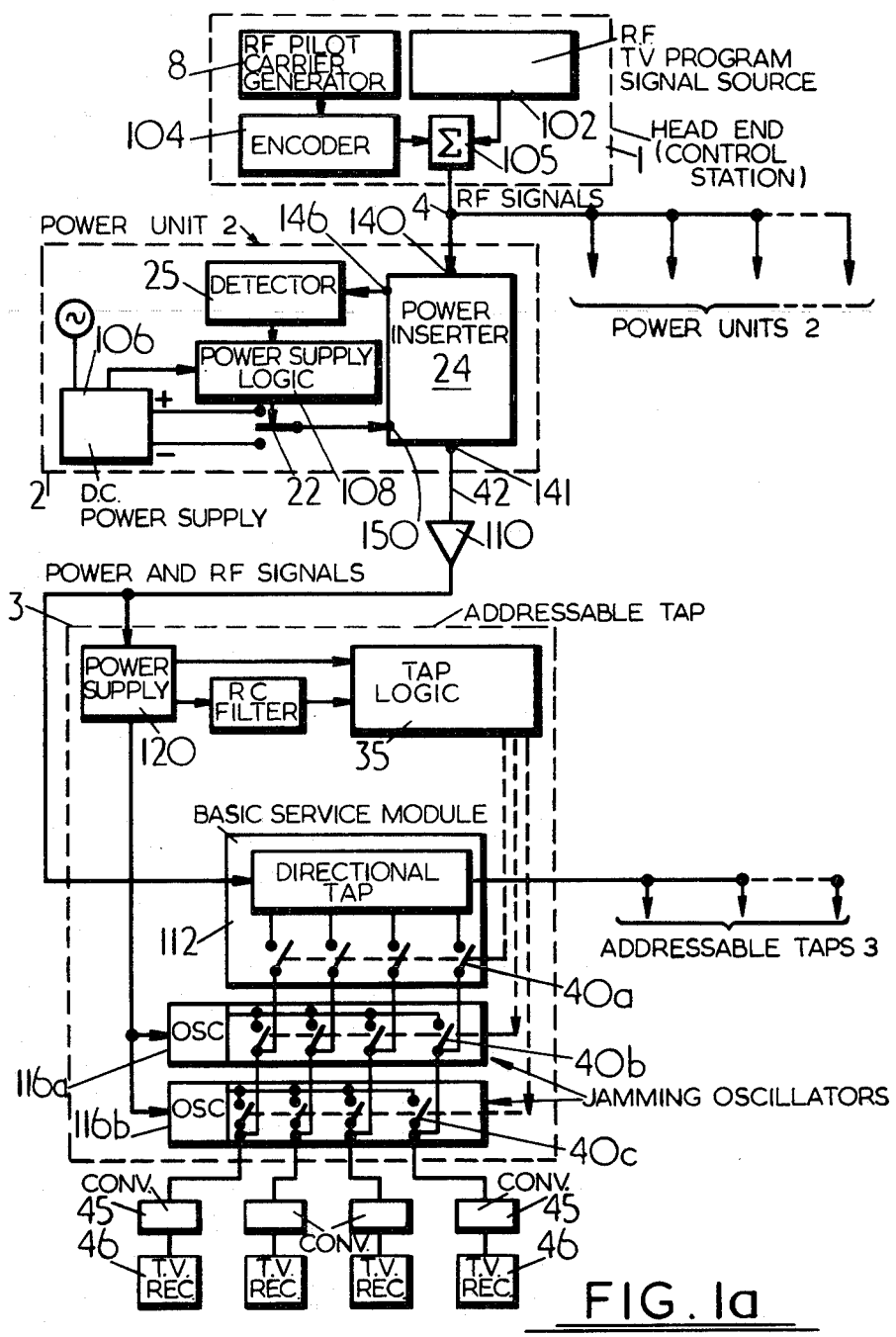
FIG. 1A is a system schematic block diagram of a preferred embodiment of a system incorporating the invention illustrating the components of the blocks of FIG. 1 and their interconnection in a multi-subscriber situation.

FIG. 1A illustrates a preferred embodiment of the invention, in the form of a cable TV system such as a CATV system, showing the principal components. The system comprises a central station or head end 1 from which TV signals orignate and by which access to the TV system by all subscribers is controlled, and a plurality of controlled subscriber directional taps 3a to which the television receivers 46 of the system subscribers are connected, usually via tunable frequency converters 45. Each of a plurality of power supply units 2 provides power to RF signal amplifiers (e.g., 110) and to a number (typically up to 1024) of subscriber taps 3 for energization of the electrical and electronic components associated therewith, e.g., switches 40a-c, and control logic forming part of decoder 35. Each subscriber tap 3 has associated with it one or more switching devices 40a-c, which permit appropriate TV signals transmitted by the cable TV broadcaster over the system to be received by the television receiver 48 of the subscriber. Certain switching devices may be used to isolate the receiver set 46 from the cable TV system completely, while others may be used to enable or disable specific TV programming channels where several programs are simultaneously transmitted on respective channels.

The same RF signal transmission from the head end is received by all of the system power supply units 2. Similarly, the coded power transmissions of a particular addressed power supply unit 2 are received simultaneously by all of the taps 3 which are served by that supply unit 2. As seen below, this permits the several power units to be addressed serially at a high rate (e.g., 20 kilobits per second) so as to be almost simultaneously addressed, while the various sets of taps 3 actuated from the respective power units may then be addressed simultaneously, in parallel, at a slow rate (e.g., about 60 to 120 bits per second). In the operation of the system, it will be understood that a signal need be sent out as to a particular subscriber station only when a change is desired in the access of that station to the cable system.

As can be seen in FIG. 1A, the head end or central station 1 comprises an RF television program signal source 102 having an output at which there are provided RF signals modulated with audio and video television information for perception by a subscriber's standard TV receiver. Also included in the head end 1 is an RF signal generator 8 which can be a conventional pilot signal generator.

The generator 8 provides at its output a constant frequency RF carrier signal. In a preferred embodiment of the invention the nominal frequency of the RF carrier signal is 220 megahertz. However, the invention is not limited to use with carrier signals of this frequency and other frequencies may be used in the practice of the invention. The RF signal generator 8 may be the same signal generator used to provide a reference or pilot signal for controlling gain or level of amplifiers in the CATV cable provided that the system is one which is operable with an unmodulated pilot signal. If an unmodulated pilot signal generator is not available one can be added to the system in the manner known to those skilled in the art.

The output of the RF pilot signal generator (that is, illustratively the 220 megahertz signal) is applied to the input of an encoder 104 located at the head end 1. The encoder 104 modulates the RF signal from the generator 8 with subscriber control function information in a manner to be described and provides a modulated RF signal at its output. The RF signal modulated with such subscriber control function information and the RF television program signal from the source 102 can both be combined in a conventional summing circuit 105 and transmitted from the head end 1 on a common coaxial cable 4 to the power supply units 2.

Each of the system power supply units 2 comprises a power inserter 24 (shown in more detail in FIG. 3) which has an input 140 to receive the RF carrier signal modulated with subscriber control function data from encoder 104 and an output 146 for applying that modulated signal from encoder 104 to a carrier receiver/detector 25 (shown in more detail in FIG. 3A) which demodulates that carrier signal. In addition, the power inserter 24 has a second input 150 for receiving power from the output of a power switch 22 (shown in FIG. 4B) and a second output 141 for transmitting the received power from the power switch 22 and the RF TV signals along the cable portion 42 connecting the power supply 2 with a plurality of addressable subscriber taps 3.

The transmitted power from the power switch 22 is AC having a square wave form derived by switching the input to the power switch 22 between respective positive and negative output terminals of a DC power supply 106. The DC power supply 106 may be a standard source of alternating current such as of 50 or 60 Hz which is converted to DC at appropriate voltage levels, or can comprise one or more batteries to provide the necessary direct voltages. In a preferred embodiment of the invention the positive and negative DC outputs of the power supply 106 between which the power switch 22 alternates are illustratively of the value of ±62 volts respectively. The DC power supply 106 also has outputs through which the plus or minus direct voltages are applied to a power supply logic circuit 108.

The power supply logic circuit 108 (shown in FIG. 4) includes digital circuitry for decoding the modulation indicative of subscriber address and control function information which is provided at the output of the detector 25 and for applying a control signal to the power switch 22 for correspondingly alternating the input of the power switch 22 between the positive and negative outputs of the DC power supply 106. At the output of the power switch 22 there are produced AC square waves which are encoded with digital data according to the subscriber control function information originally modulated on the RF carrier from the generator 8 at the head end 1. The encoded AC squarewaves have a variable cycle and carry data at one bit per cycle, that is, at a variable bit rate.

The encoded AC square waves are applied to the input 150 of the power inserter 24 and are inserted through the output 141 of the power inserter 24 onto the cable portion 42 for transmission to the addressable subscriber taps 3. The power output of the power supply units 2 may be applied back along the cable portion 4 toward the head end 1 as well as forward toward the taps 3 along the cable portion 42. This may energize amplifiers and other equipment either between the head end 1 and power supply units 2 or between the power supply units 2 and their associated subscriber taps 3 with appropriate power. The power transmitted along the cable portions 4 and 42 may for example be utilized to drive repeater amplifiers 110 for amplifying the program signals being transmitted to the subscriber taps 3.

Each addressable subscriber tap 3 has a basic service module 112 having an input at which the RF program signals and power are received and an output through which the RF program signals and power are transmitted to the remaining addressable taps. The output of the basic service module 112 is also applied through switches 40a (one for each subscriber served by the tap 3, shown illustratively as four in number) to frequency converters 45, each connected to one subscriber's television receiver 46 of the set which is served by that particular addressable tap 3. The output of the basic service module 112 may contain all of the transmitted RF program signals, such as basic TV programs, pay-TV channel programs, and other special services.

In order to prevent unauthorized subscriber access to particular channels (e.g., a pay-TV channel for which no subscription has been taken) jamming oscillators 116a and b may be connected through switches 40b and c respectively to the inputs of the frequency converters 45 associated with the respective television receivers 46 to be barred. Each of the jamming oscillators 116a,b provides at its output a signal the frequency of which is varied about a nominal center frequency nearly equal to the carrier frequency for one of the channels to be barred.

The frequency of the jamming oscillators is varied by means of a wobbulator circuit, such as an oscillator with a frequency tuning element such as a varacter diode to which a varying voltage is applied. As the voltage applied to the varactor diode changes so does the frequency of the wobbulator output. A variable-frequency jamming oscillator is preferable to a fixed frequency oscillator in that a fixed frequency jamming signal has been found to be only partially effective in denying non-subscribers access to the information on the pay channels which are to be provided only upon special subscription.

Complete service to a subscriber is enabled by closing the switch 40a linking the output of the basic service module to the tap output port 49 serving the subscriber's converter and by opening the switches 40b,c on the jamming oscillators which connect the outputs of the jamming oscillators 116a,b to that output tap port 49. Directional couplers (not shown) may be provided between the output of the basic service module and the output port 49 to prevent signals from re-entering the output of the basic service module, which might cause one subscriber to interfere with the reception of another subscriber due to the limited isolation available in the basic service module.

In a preferred embodiment of the invention a single addressable tap 3 serves four subscribers. In each subscriber tap there are three switches 40a, b, c associated with each of the respective four subscribers or a total of 12 switches connecting the four subscribers' television frequency converters 45 to the basic service module 112 and jamming oscillator modules 116a and b. The first (40a) of the three switches connects the subscriber's output port 49 with the basic service module 112. The remaining two switches 40b,c connect the subscriber's output port 49 with the jamming oscillators 116a and 116b respectively.

In addition to the 12 control function codes associated with the twelve switches 40a,b,c there are two further control codes each of which controls program reception for all four subscribers. These two control codes and reset devices control all the switches 40a-c of the basic service module and jamming oscillators. Specifically, one of these two codes sets all of the output latches in the tap logic circuitry (to be later described in conjunction with FIG. 6) to a logical value of "1" and the other code resets the latches to "0".

A DC power supply 120 for the tap 3 receives at its input from the power supply unit 2 the AC square wave power encoded with subscriber control function information. The tap power supply 120 provides at its outputs 120a and 120b DC power for energizing the jamming oscillators 116a,b and a tap logic circuit 35. The power incoming flow and program signals are routed via lead 110a through the basic service module 112 and is interrupted if the basic service module 112 is removed.

The encoded square wave signals from the power supply unit 2 received in the tap power supply 120 are also supplied by lead 120c to a data output of the power supply 120. This data output of the power supply 120 is connected to an RC filter the output of which is applied to the data input 35a of the tap logic circuit 135. The data encoded on the AC square wave power is decoded in the tap logic circuit 35, and the decoded data is converted into signals which are applied from outputs 35b of the tap logic 35 to the control inputs of function switches 40a-c to regulate subscriber access to the programs of the system.

At the head end 1, a bit stream comprising a data word is formulated for each individual system subscriber. The data word includes information identifying the subscriber's unique tap address, his system access control functions and a power supply address which uniquely corresponds to the power supply unit that energizes the subscriber tap which is to be controlled. All the complete data words are sent out in sequence, and simultaneously to all the power supply units 2. Only those data words received at a given power supply unit 2 which contain address information corresponding to the address of that power supply are used to modulate the power output from that power supply unit 2. Data words which are not intended for that power supply unit and its associated taps are ignored, and have no effect upon the output of the power supply unit. Each subscriber tap thus responds only to data words contained in the power supplied to it from its own power supply unit. This reduces the amount of address decoding necessary in each tap and the time to communicate with all the taps in the system. When one power supply unit is communicating with a tap, a second power supply unit can be addressed so that it will concurrently communicate with a tap in its section.

Figure 2:
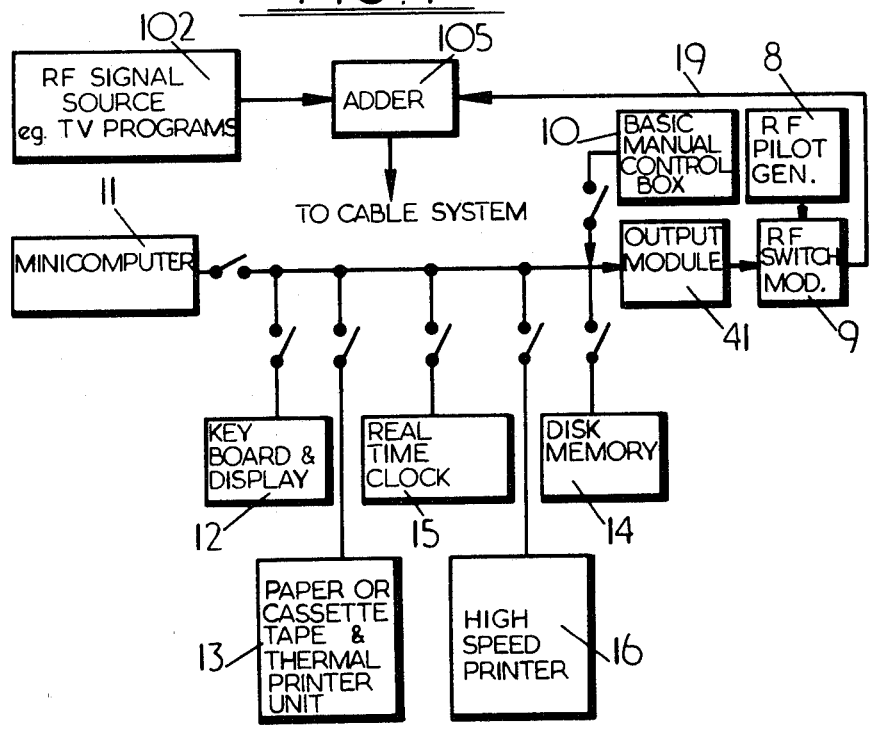
FIG. 2 is a block diagram showing examples of the various types of apparatus which can be used to transmit subscriber control information from the head end of a cable television system incorporating the invention.

As shown schematically in FIG. 2, the head end of the system generally includes an RF pilot generator 8 the output of which is of constant frequency and amplitude. The RF pilot generator may be conventional in design, and any suitable carrier frequency may be used, a frequency of 220 MHz being employed in a preferred embodiment of the invention. This signal may now perform two functions, namely, the usual pilot-frequency function (e.g., for gain level control of repeater amplifiers) and as a carrier for the subscriber control function information.

The output of the RF pilot generator 8 is applied to an RF switch 9 which when closed permits transmission of the RF carrier to a cable 19 and which when opened cuts off RF carrier transmission to cable 19. Thus by opening and closing the RF switch, pulses of RF carrier transmission may be produced with the width of the pulses depending upon the duration of the closing of the RF switch. The switch thus serves as a modulator for the pilot frequency signal. By assigning two possible widths to each pulse produced by RF modulator switch 9, each pulse may contain one bit of information. For example a wide pulse may signify a binary 1 while a narrow pulse signifies a binary 0.

The 25-bit data words are serially encoded on the RF carrier by the use of pulse duration amplitude modulation (PDM), as described. While other modulation schemes may be used, and this invention is not limited to the particular modulation scheme employed in the preferred embodiment, PDM has been found desirable in that the data is self-clocking, obviating any requirement for complicated bit synchronization, and because standard pilot carrier transmitters and receivers may be easily adapted to the application herein described. In view of the number of bits that must be received by a tap to select and control the subscriber access, as will subsequently be described, a data rate from the head end of 20 kilobits per second has been found useful.

The opening and closing of the RF switch is accomplished in response to the output of an output module 41 which may receive data representing the identities of each of the subscribers and the latest control function status assignable to each of the subscribers. As discussed more in detail below, this data may be derived from a mini-computer 11, a keyboard and display 12, or a recorder such as a paper or cassette tape unit 13. Subscriber control data may be manually inserted into the system by an operator by means of a manual control box 10 operatively connected to the RF switch for opening and closing the RF switch according to the entered subscriber data.

A 25-bit word has been found suitable for transmitting access information for each subscriber of a moderately large size cable TV system. Two of the 25 bits are used to signify the start and stop of each data word, respectively. Seven bits are used to identify the address of the power supply unit serving the subscriber tap which is to be controlled by the data word. This permits communication with up to 128 ($2^7$) power units. Ten bits are used to identify the subscriber tap address to be controlled. The use of a ten-bit tap address permits communication with up to 1,024 four-subscriber taps for each of the power units in the system or up to 4,096 subscribers per power unit. Five bits of information are designated for defining the desired control function for the individual subscriber whose access to the system is being determined. The five-bit control segment of the data word can control, for example, up to 16 two-state control functions, e.g., two-position switches. This will provide 4 functions for each of the four subscribers. One bit is provided for a parity check of the transmission links. Using one RF pilot frequency, therefore, up to 524,288 subscribers can be controlled. By adding more frequencies, this number can be increased.

In the manual control mode shown in FIG. 2, utilizing control box 10, the control signals serially applied to the input of the RF switch 9 can come from a plurality of encoded switches. Electronic logic decoders provide the 25 bits of information to be transmitted. In such a manual system, a customer "address" book is referenced by an operator who sets the switches to indicate the bits of information which are to be transmitted. A "transmit" button (not shown) may then be pressed, at which time the control box 10 will automatically serially transfer the entered data to the amplitude modulator 9 to encode the RF carrier signal with the desired subscriber address and control data.

In a more sophisticated system, less prone to operational errors, a mini-computer 11 and keyboard with a small display 12 are provided. The subscriber "addresses" (for power unit and tap) can now be easily entered in decimal notation. With a teletype machine, or other printer (not shown), a printed record of all entries may be maintained, as well as a permanent paper or magnetic tape, if desired, for future automatic updating or control of the network. Another system option incorporates a dual magnetic cassette or cartridge storage and thermal printing machine 13. One cassette or cartridge can contain the customer addresses (in any order desired), and another a record of entries for the day (week or month). For a reasonably sized system, several cassettes or cartridges will be required to hold all of the customer addresses. Updated address tapes can be made, by the same mini-computer (from the entry record tape and the keyboard) during off hours. A large tape unit, e.g., a reel-to-reel recorder employing magnetic tape may be used to hold all customer data on a single tape.

A further optional refinement to the system includes a large disc memory 14, a real time clock 15, and a high speed line or form printer 16. All of the customer's data may now be in the disc memory, such as name, address, financial record, tap and power unit addresses, and program(s) desired, etc. This system can automatically maintain billing status; generate invoices and internal program usage printouts; automatically turn on and off the desired programs for customers; and automatically update the entire system (at night) to catch up with low priority updates and correct any noise-induced errors. If a two-way truck is in use, the return data may include status information from the power units on signal levels, quality, etc., as well as customer data, all of which may be monitored by the computer.

In a preferred embodiment of the invention, keyboard and display 12 is used to enter the data for subscriber addresssing and function control in decimal form. Referring now to FIG. 2A, the data is manually entered in decimal form by means of a conventional keyboard 122 operatively connected to a conventional storage register 124. A commonly available electronic desk calculator may be used to provide the keyboard storage register and display operatively interfaced to the output module 41. Digits punched on the keyboard 122 are individually stored in the register 124 for display on an indicator (not shown) of the type commonly found on electronic calculators (e.g., light-emitting diodes or gas discharge numeric indicators). The output of the storage register 124 is connected to an interface module 126 which includes a conventional 7-segment to binary-coded-decimal (BCD) converter 128. The output of the converter 128 is connected to eight individual conventional parallel/serial registers 130a-h, the first 130a of which holds 5 bits of information and the remaining ones 136b-h each capable of storing up to four bits of information, that is, each having four bit positions. The individual parallel/serial registers 130a-h are connected to form a single par./ser. register capable of storing 25 bits of information, that is, having 25-bit positions, in a conventional manner known to those skilled in the art, and may be replaced by a single 25-bit register. The data output of the par./ser. register 130a-h is then applied to the RF amplitude modulator 9 which correspondingly amplitude modulates the RF carrier signal from the RF signal generator 8, as described.

A 25-bit data word for coding on the RF carrier signal is stored in the parallel/serial registers 130a-h as follows. A stop bit is automatically entered into the first bit position of the par./ser. register 130a. The second bit position of the register 130a holds a parity bit the provision and purpose of which will later be described. The remaining three bit positions of the first par./ser. register 130a hold the first three bits of the power unit address of the binary-coded data word. The second register 130b holds the remaining four bits of the power unit address. The 10-bit tap address is stored in par./ser. registers 130c-e. Register 130f holds a 2-bit control function identifier word segment and register 130g holds two bits for individual subscriber selection. Register 130h holds one bit indicating the desired state (on or off) of the selected control function switch and an automatically entered start bit.

The power unit address, tap address, subscriber address, and 3-bit control function information are thus entered in decimal notation via the keyboard 122 into the storage register 124. The data is then transferred from the register 124 through a 7-segment to BCD converter 128, where each digit is converted to binary form, and then placed into the parallel/serial registers 130a-h. As is conventional in the desk calculator 11, the data stored in the storage register 124 is sequentially strobed, that is, demultiplexed, since only one digit may be read out of the register 124 at a given time. To distribute the data among the registers 130a-h the digit select strobe signals are used to demultiplex the stored digits from the register 124 for loading the eight registers 130a-h. Eight wires are provided leading from the strobe output of the calculator 11 to the eight respective parallel/serial register load control inputs. A strobe signal appears on each of the 8 wires in sequence permitting the selected register to which the wire is connected to accept the data output of the converter 128 which is a binary representation of the decimal digit stored in the selected position of the storage register 124. A BCD representation of the 22 bits of information representing the power unit address, the tap address and the control function data is thus stored in the registers 130a-h.

The stop and start bits of "0" logical value generated in the interface module 126 are added as part of the data transfer sequence. Also included in the interface module 126 is a conventional parity tree which may be in the form of two modulotwo adders. Each functional output of the registers 130a-h is connected to an input of the parity tree 134 to count the number of "ones" in the data word. If the total number of "ones" is an odd number, a "0" is stored in the parity bit position in the register 130a. If the total number of "ones" is even, a "1" is stored in the parity bit position of the register 130a. In this manner the parity of the complete 25-bit data word stored in the parallel/serial registers 130a-h is always odd. Maintenance of odd parity is used to permit a check on the validity of the data received at the cable TV system power units 2. Any interference with the RF signal which changes any data bit will change the parity of the transmitted word from odd to even thereby indicating invalidity of the data received at the power units 2.

A 20 kHz clock 136 has its output connected through a gate to the clock input of the parallel/serial registers 130a-h. During transmission, the clock serially shifts the parallel-stored data out of the registers 130a-h to the modulator 9 for varying the amplitude of the RF carrier from the generator 8 at a 20 kilobits per second rate.

In modulating the amplitude of the RF carrier to create pulses of the carrier signal at the output of the amplitude modulator 9, wide pulses (preferably greater than 25 microseconds where a 25 microsecond clock pulse is used at the decoder) are employed to indicate a logical "1" and narrow pulses (less than 25 microseconds) are employed to indicate a logical "0". Pulse widths of 31 microseconds and 19 microseconds have been found satisfactory for the wide and narrow pulses respectively when a 25 microsecond clock pulse is used at the decoder. Other pulse durations may, however, be used within the scope of the invention.

In addition to serially encoding the 25 bits of address and control information onto the carrier signal from the generator 8, the modulator 9 is caused to encode an additional 25 bits of information all with logical value "1" on the carrier following each 25-bit coded data word. Thus for each data word 50 bits are transmitted over the cable 4 to the power inserter 24 of each of the power units 2 in the cable system. Since the start and stop bits are of logical "0" value the possibility of transmitting 25 consecutive bits other than the intended binary-coded control word with first and last bits having zero value is effectively precluded. All data words intended to be transmitted have 23 consecutive bits bounded at both ends by "0" bits, and the power units are made to respond only to such data words as will later be explained, thereby effectively precluding false responses.

The pulse-duration amplitude-modulated carrier signal containing the subscriber access control information from modulator 9 is combined in a summing circuit 105 with the program signals from the RF program signal source 102 and the composite signal is transmitted to all of the system power units 2. The input 140 of the power inserter 24, shown in schematic form in FIG. 3, receives all coded RF carrier signals transmitted from the head end 1 on the cable 4. These signals are coupled by the resistor 142 and capacitor 144 to the first (data) output 146 of the power inserter 24 to the RF carrier receiver/detector 25 (FIG. 1A). The program signals received at the input 140 of the power inserter 24 are also permitted to pass through the power inserter, to output 147 with low frequency components removed by a blocking capacitor 148, to the subscriber taps 3 served by the power unit. The program signals are thus permitted to pass directly through the power inserter 24 to the subscriber taps.

The direction of the power is controlled by conducting links 152 and 154. As shown in FIG. 3, power supplied at input 150 from power switch 22 (FIG. 1A) may travel in both directions from the power inserter 24, that is, both toward the head end 1 and away from the head end 1, e.g., toward the subscriber taps 3. Removal of link 152 prevents power flow from the power inserter toward the head end 1. Similarly, removal of link 154 prevents the flow of power away from the head end 1 or toward the taps 3. Grounded capacitors 156 and 158 equalize the frequency response of the signals transmitted through the power inserter. Respective LR chokes 166 and 168 remove undesired high frequency components from the power received at the input 150 and transmitted back toward the head end 1 or forward toward the taps 3. Capacitors 160, 162 and 164 also remove high frequencies from the power.

Referring additionally to FIG. 3A, the RF signals flow from the output 146 of the power inserter to the input of a conventional impedance-matching circuit 170 in the RF carrier receiver/detector 25. The output of the impedance matching circuit 170 is connected to the input of a first RF amplifier 172a. The signal is amplified in the RF amplifier 172a and then filtered in the filter 174a. There is further amplification and filtering in the amplifier 176 and filter 178a. The signal is again amplified in the RF amplifier 180a and then applied to a detector circuit 182a, where the envelope of the RF carrier signal containing the address and control information is detected.

The detected AM signal is amplified in a DC amplifier 184 and then applied to an RC filter 186a to remove any remaining RF carrier signal. The output of the RC filter 186a is connected to the input of a level shifting buffer 188a whose output signal control data is applied to a decoder 6 in the power supply logic circuit 108 (see FIG. 4) for decoding and data conversion and to a clock pulse generating monostable multivibrator (one-shot) 172 for operating the decoder 6 and a 25-bit shift register 174.

The data is serially received by the shift register 174 in the order it appeared in the parallel/serial registers 130a-h at the head end. That is, the bit in the first position of register 174 is the stop bit, the next bit is the parity bit, the next 7 bits represent the power unit address, the following 10 bits indicate the tap address, the next 4 bits identify the individual subscriber's function control switch to be operated, the following bit determines the state of the function control switch to be operated, and the last bit is the start bit. As will be recalled, the stop and start bits are "0".

The positive-going edge of each input data bit signal at the output of the buffer 188a triggers a monostable multivibrator 172 to provide a 25 microsecond pulse, that is, ½ of the clock period of the input data for a 20 kbps bit rate. Each clock pulse loads the data and shifts the contents of shift register 174. The decoder 6 is responsive to a long pulse data bit ("1") and short pulse data bit ("0"). The start bit and stop bit are used to identify that a word has been entered into the register 174, as detected from the outputs of the respective inverter buffers 180 and 182 being "1"s.

A conventional parity tree 178 (which can be a modulo-two adder) determines the parity of the received data word. The output of the parity tree 178 is high when parity is odd and low when parity is even. The first and last bit outputs of the shift register 174 are connected to respective inverter amplifiers 180 and 182. If the stop and start bits are "0" (or low) the outputs of the inverters 180 and 182 will be "1" (or high). A 7-bit comparator 176 is enabled by the clock pulse at lead 441 and receives the first 7 bits from register 174. The other comparator inputs are connected to a 7 pole, double throw switch, preset during installation of the power unit 2. The outputs of the 7-bit comparator 176, parity tree 178, and inverters 180 and 182 are applied to four respective inputs of an AND gate 184. It will be recalled that each 25-bit data word is separated from an adjoining word by 26 "1"s and that the start and stop bits will only have "0" value when the complete received data word occupies its proper position in the 25-bit shift register.

Only when all of the inputs to the AND gate 184 are high is the output of the AND gate 184 high. A high output signal from the AND gate 184 enables an 18-bit parallel/serial register 186 to receive 15 bits of data from the 25-bit shift register 174. Specifically, the data stored in the 10th through 24th bit positions of the 25 bit shift register 174 is transferred to the 3rd through 17th bit positions of the 18 bit parallel/serial register 186 in conventional manner. The number of "1"s in the transferred 15 bits is counted in a parity generator 188 by which a "1" or "0" is placed in the second bit position in the 18 bit shift register 186 as required to make the parity of the word stored in the 18-bit shift register 186 even. Start and stop bits of logical value "0" are automatically inserted in the last and first bit positions in the 18-bit shift register 186.

The continuous data readout from parallel/serial register 186 is caused to operate power switch 22 by way of lead 451. As each bit is read out it enables formation of the next clock pulse transmitted through lead 452. The readout is synchronized by 120 Hz clock oscillator 192, which free runs unless synchronized from the power line input lead 454. Clock pulses at 120 Hz are on line 455, inverted pulses on line 458.

The parallel/serial register 186 output bits respectively provide one full cycle of either 120 Hz (where the shorter pulse is binary "0") or 60 Hz (where the longer pulse is binary "1") at the output of NAND gate 459, and each positive clock edge on line 452 shifts parallel/serial register 186 to the next stored bit. Thereafter "1" bits are continuously generated by shift register 186 to thereby produce an output normal 60 Hz transmission at data line 451 in the absence of presentation of further data words. That is, a single coded word is read through whenever the power unit is addressed and otherwise the power supply is uniformly 60 Hz. The constant condition is simply met by holding voltages on lines 460 and 470 constant without transition. Thus the nature of the signal output of parallel/serial register 186 is a DC level changing when data goes from "0" to "1" and vice versa, generally known in the art as a non-return-to-zero type signal.

The parallel/serial register data is taken bit by bit from line 460 and the presence of a "1" polarity signal will gate AND circuit 461 for 60 Hz oscillations from counter 456 and lead 457, which then pass through enable gate 461 and then to the OR circuit 462 and the polarity inverter 501 to output NAND gate 459. The opposite polarity "0" signal by way of inversion at the input buffer 502 will gate AND circuit 463 to thereby gate the 120 Hz oscillations on line 455 to the output NAND gate 459.

It is necessary however to remove all DC levels from the system power and to have proper phase synchronization at the end of a "0"0 cycle and the start of a "1" cycle or vice versa. Since the period of the 60 Hz square wave is twice that of the 120 Hz square wave, the beginning of a cycle of the first 60 Hz square wave will not always coincide with the end of a 120 Hz cycle. Therefore, there may be times when a "1" is to be transmitted following the transmission of a "0" at which time the 60 Hz signal will be in the middle of a cycle, that is, crossing from positive to negative. At these times the inverse of the 60 Hz signal will be at the beginning of a cycle and hence a cycle of the inverse signal is desirably selected for application to the AND gate 461. In this fashion a complete 60 Hz cycle of the proper polarity is always available for application at the output of the NAND gate 459 whenever a "1" is detected and similarly a 120 hertz cycle is always available whenever a "0" is detected. Thus, the 60 Hz and 120 Hz cycles all have the same polarity.

The output of the 120 Hz clock oscillator 192 is applied to flip-flops 465 and 468. The 120 Hz clock signal is also applied to inverter 505. The 120 Hz output of inverter 505 is connected to the dock input of a divide-by-2 counter 456 and also to the input of the AND gate 463. The appropriate 60 Hz signal from the counter 456 is applied to the gate 461 depending on the output of an AND gate 507 which is applied to the reset input of the counter 456. The output of the AND gate 507 is high whenever a "0" from the register 186 is followed by a "1". A "0" from the register 186 is inverted in a NAND gate 509. The output of the NAND gate 509 enables the flip-flop 465 to provide a "1" at its output to the AND gate 507. The output of the AND gate 507, however, remains low due to the action of the inverter 511. If the next bit out of the shift register 186 is a "1" the output of NAND gate 509 goes to a "0" and is reinverted in the inverter 511 to a "1" or high signal applied to the previously low input of the AND gate 507. The result is a high signal at the output of the AND gate 507 which resets the counter 456 so that the next 60 hz alternating squarewave is initiated in proper phase. The output of flip-flop 468 is caused to go to a "0" when a capacitor 513 coupled positive transition occurs at the output of the OR gate 462, causing the output of the NAND gate 459 to remain at a "0" until the next positive edge of the 120 Hz clock 455, thus removing any transients from the output of NAND gate 459.

Figure 4:
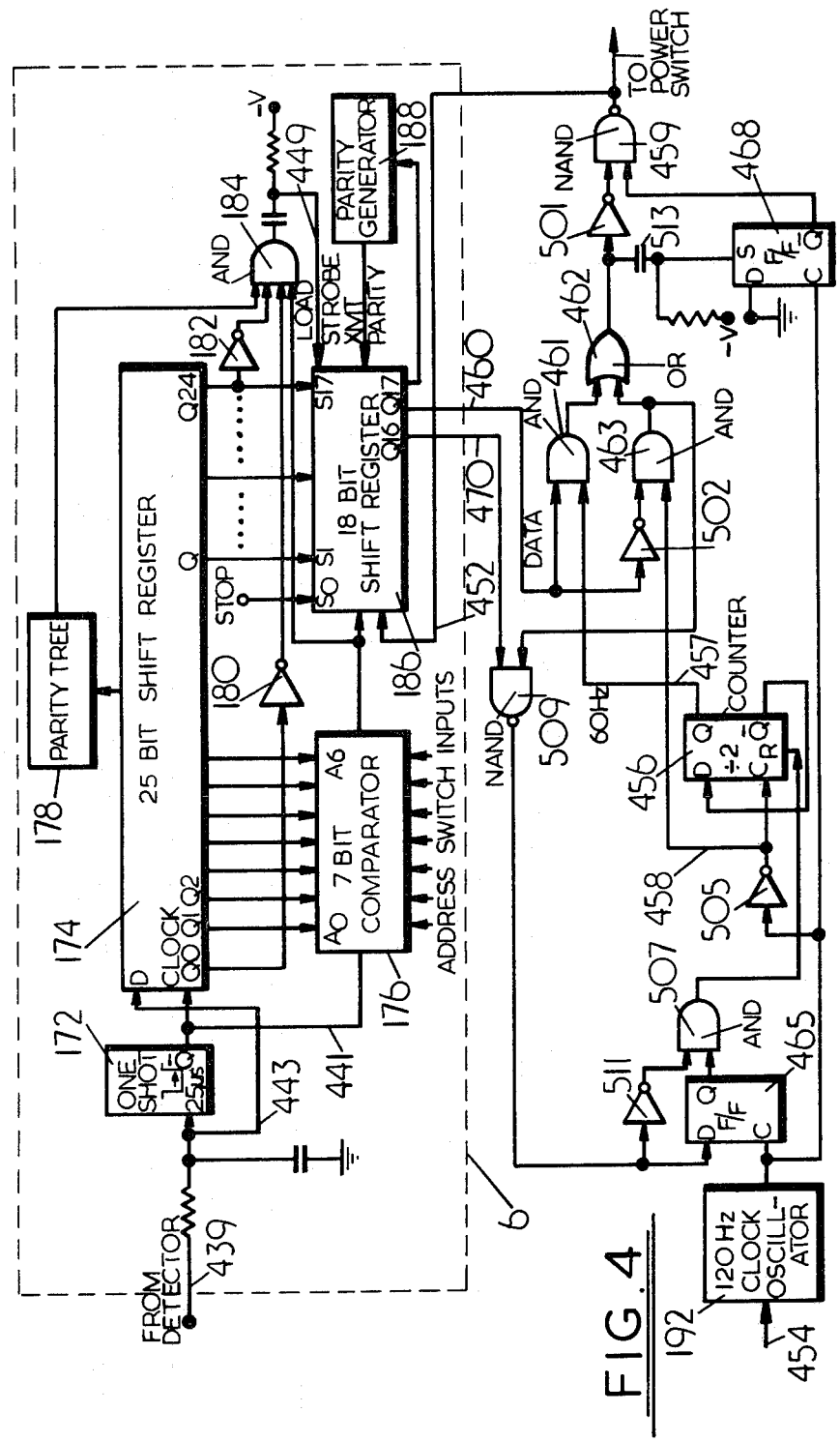
FIG. 4 is a block diagram of program circuits for encoding the power supply frequency with binary code data words.

The circuit of FIG. 4 thus constitutes the power unit logic 18, which converts the data signals into coded power transmission, with intermixed full cycles of 60 Hz and 120 Hz frequency, each 120 Hz cycle representing a binary "0" and each 60 Hz cycle representing either a binary "1" or an uncoded period of power flow.

Figure 4A:
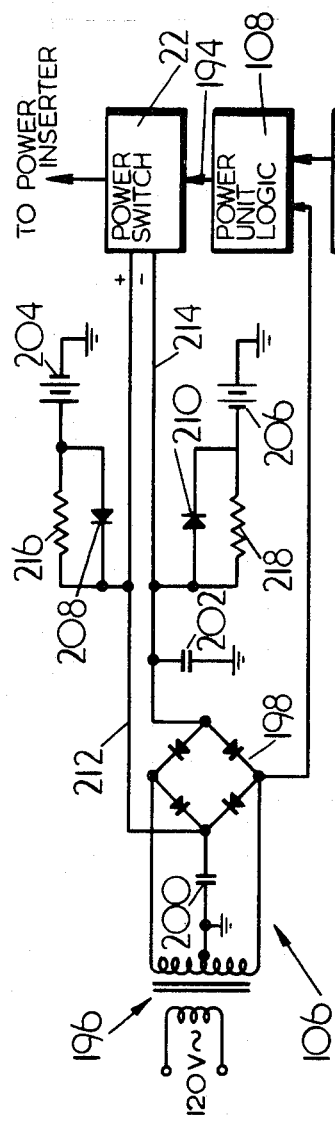
FIG. 4A is a schematic diagram of the d.c. power supply section of a power supply unit useful with a preferred embodiment of the invention with the powered circuits shown in block form.

Referring now to FIG. 4A the output of the power unit logic 108 (see FIG. 1A) is applied to a control input 194 of the power switch 22. The power switch 22 has power inputs connected to plus and minus direct voltage sources (of preferably +/−62 volts) respectively, provided by the power supply 106. A power transformer 196, preferably of the saturating type to prevent over-voltage, is used in the power supply 106 with a center tapped secondary for providing +/− DC power by way of full-wave rectifier 198 and capacitor filters 200 and 202. The power transformer 196 also provides squared output wave forms for synchronization. To compensate for input under-voltage, batteries 204 and 206 may be connected via diodes 208 and 210 to the DC lines 212 and 214. The batteries 204 and 206 are preferably trickle-charged through resistors 216 and 218. Fuses and circuit breakers (not shown) are preferably used in a conventional manner.

The power switch 22 switches either +62 volts or −62 volts to its output by means of a transistor switch circuit. Preferably there is a limit imposed on the slew rate dv/dt to prevent harmonics and amplifier power supply problems. One such circuit configuration is shown in FIG. 4B.

Figure 4B:
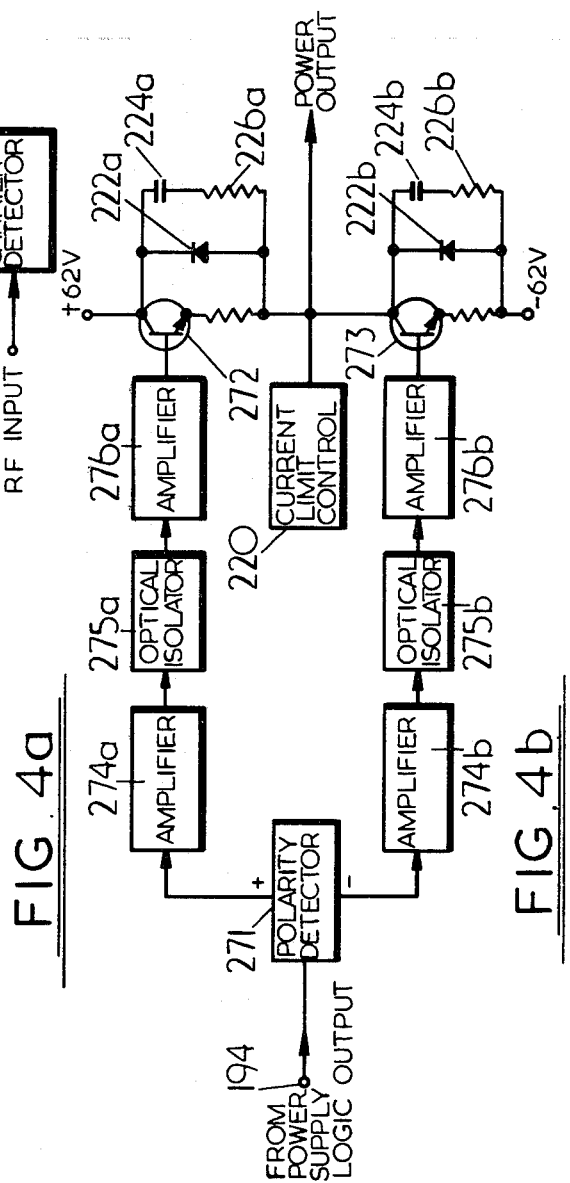
FIG. 4B is a schematic diagram partly in block form of a power switching circuit for the preferred embodiment of the invention providing AC power, encoded with binary coded signals.

Referring to FIG. 4B a conventional polarity detector 271 produces the positive drive to transistor switch 272 and the negative drive to transistor switch 273 thereby providing an AC signal wave power output from the power switch 22. Amplifiers 274a, b drive respective optical isolators 275a,b or equivalent voltage level changers for operating respective driver amplifiers 276a,b for causing switching of the transistor switches 272a,b. The optical isolators 275a, b each include a light source responsive to the respective outputs of amplifiers 274a,b and a light sensor having a voltage output which is a function of the intensity of the light from the source. The optical isolators 275a,b electrically isolate the signal input section of the power switch 22 (polarity detector 271 and amplifiers 274a,b) from the power switching output section. A current-limit control device 220 is desirable for protecting the output transistors 272 and 273. The outputs of the transistors 272 and 273 are applied to respective snubber circuits each of which includes a diode 222a,b in parallel with a series combination of a capacitor 224a, b and resistors 226a,b. The snubber circuits prevent the positive direct voltage output from going over the positive DC supply voltage and the negative direct voltage output from going under the negative DC supply voltage and neutralize the inductive effects of the load, i.e., the system's cables.

In operation the power switch 22 senses at its input the polarity of the low level signal output pulses from the power logic 108 which is a series of squarewave pulses, each cycle of which has a frequency of 60 hertz when it represents a "1" and 120 hertz when it represents a "0" and in response produces power pulses of frequency and polarity similar to those of the low level input pulses (60 or 120 Hz).

The decoded power output signals of the power switch 22 are applied to the input 150 of the power inserter 24 (FIG. 3) as herebefore described and are then transmitted along the cable portion 42 toward the taps 3 and/or back to the head end 1 depending on the configuration of links 152 and 154. At each addressable tap 3 (FIG. 1A) powered by the power unit 2, the coded power output of the power unit 2 and the accompanying RF program signals are received at the power supply 120 disposed in the tap 3.

Figure 5:
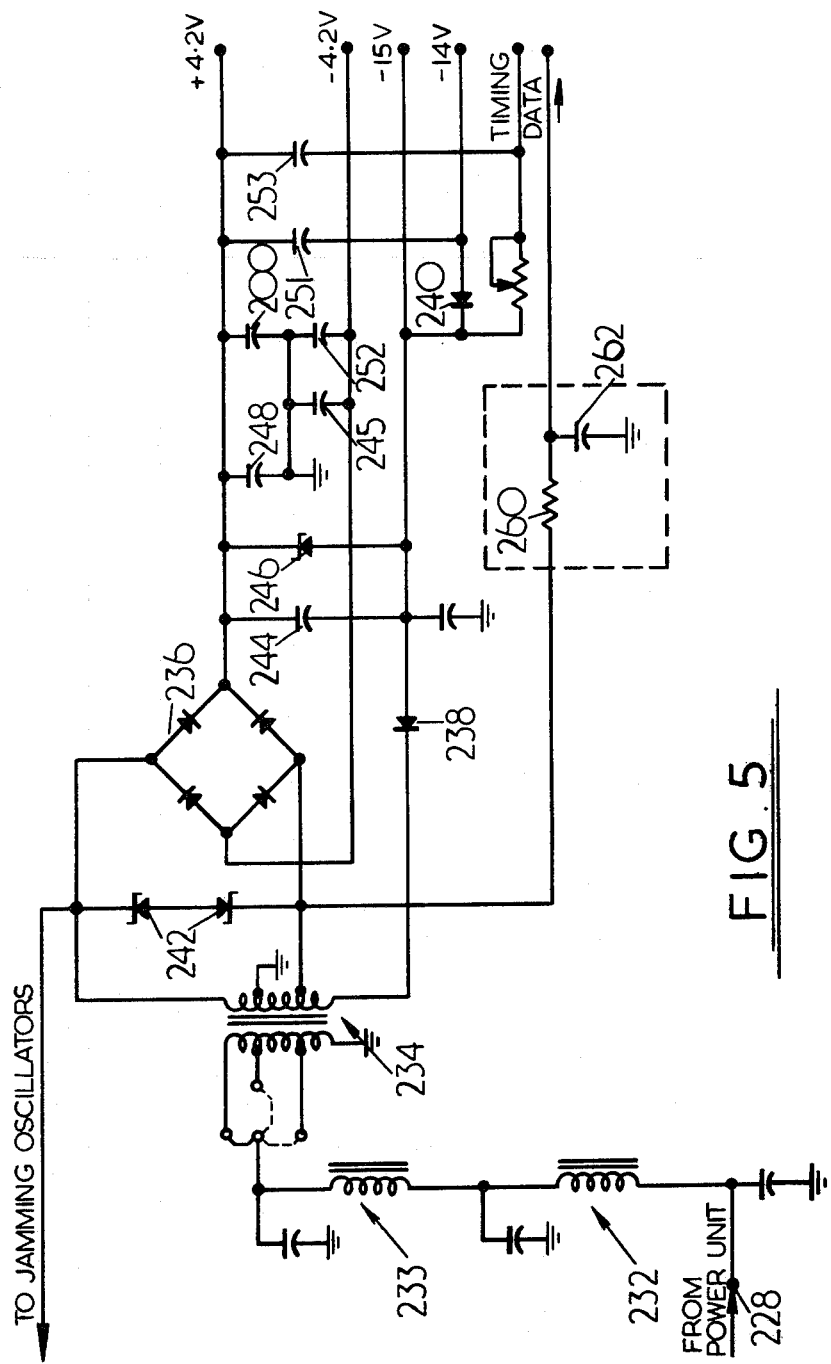
FIG. 5 is a schematic diagram of the power supply section of a tap useful with the preferred embodiment of the invention.

Referring now to FIG. 5 there is shown a schematic diagram of the tap power supply 120. The signals received at the tap input 228 are filtered in LC filters 230 and 232 to remove the high frequency program transmissions, leaving only the coded power to be applied to the primary winding of a power transformer 234. The secondary of the power transformer 234 has a grounded center tap. Pick-off points are provided on the secondary winding of the transformer 234 for applying the AC secondary signals to a full-wave bridge rectifier 236, to rectifier diodes 238 and 240 and to an input of the jamming oscillators 116a, b. Input regulation to the full-wave rectifier 236 is provided by oppositely polarized series connected zener diodes 242 and by the saturating core design of the transformer.

The output of the full wave rectifier 236 is filtered in capacitor 244. Zener diode 246 provides a regulated −15 volt direct voltage output of the rectifier diode 238. A capacitor filter network including capacitors 248, 249, 250, 251, 252 and 253 filters the positive and negative outputs of the full-wave rectifier 236 to provide DC outputs of +/−4.2 volts respectively. A negative 14 volts DC is provided at the output of the diode 240. The direct voltages of +/−4.2 volts, −15 volts and −14 volts are used to power the tap circuitry including the tap logic 35 and jamming oscillators 116a,b.

The data-coded power flow is taken from the secondary winding of the transformer 234 and filtered in an RC network comprising a resistor 260 and capacitor 262. The filtered data signal is then applied to a data input of the tap logic circuit 35 (FIG. 1A).

Figure 5A:
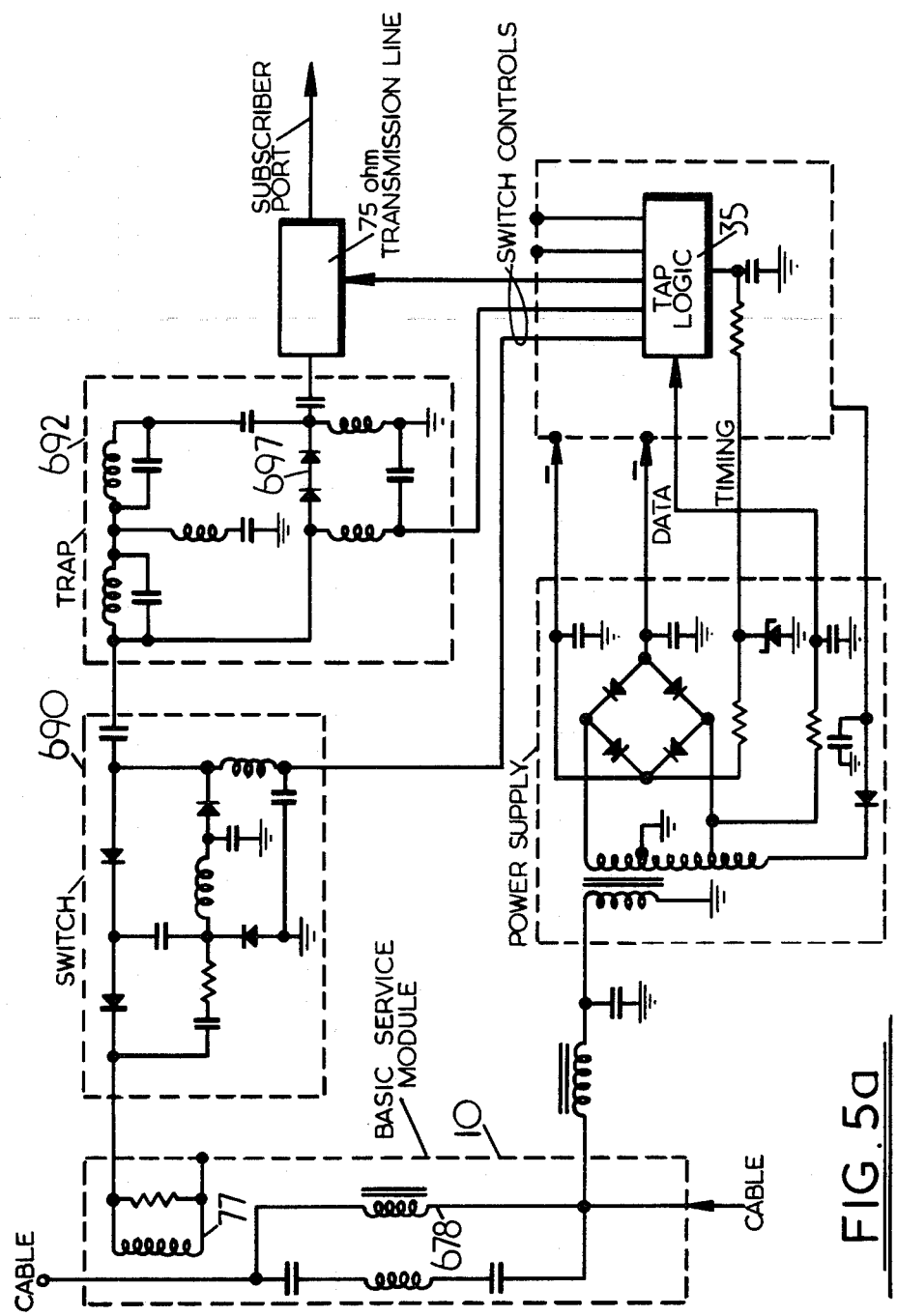
FIG. 5A is a schematic diagram of a tap which may be used with the apparatus of the present invention.

The previously described power supply of FIG. 5 is only one of several types that may be used. FIG. 5A illustrates in schematic form a tap circuit including another power supply configuration for powering one type of tap logic circuit, basic service module and a controlled-channel module connected to a filter trap. In the circuit of FIG. 5A the cable 42 is tapped at transformer 677 to obtain the television program signals and at line 678 to obtain the coded AC power transmission from the power unit 2. The coded power is applied to an LC filter to remove high frequency components and then to the primary winding of the tap power supply transformer. The coded power is then applied to the tap logic circuit 35 which controls an RF switch 690 for allowing or preventing the application of the television signals to subscriber stations. A filter trap 692 filters out a specific channel of television program signals for which no subscription has been taken.

A diode switch 697 in parallel with the filter trap 692 can be closed in response to a signal from the logic 35 to short circuit the filter 692 for permitting access by a subscriber to the television programs on the channel.

A more detailed description of a different tap 3 which contains variable frequency (wobbulated) oscillators to selectively jam one or more channels of television programing which are to be denied to a subscriber follows.

Figure 6:
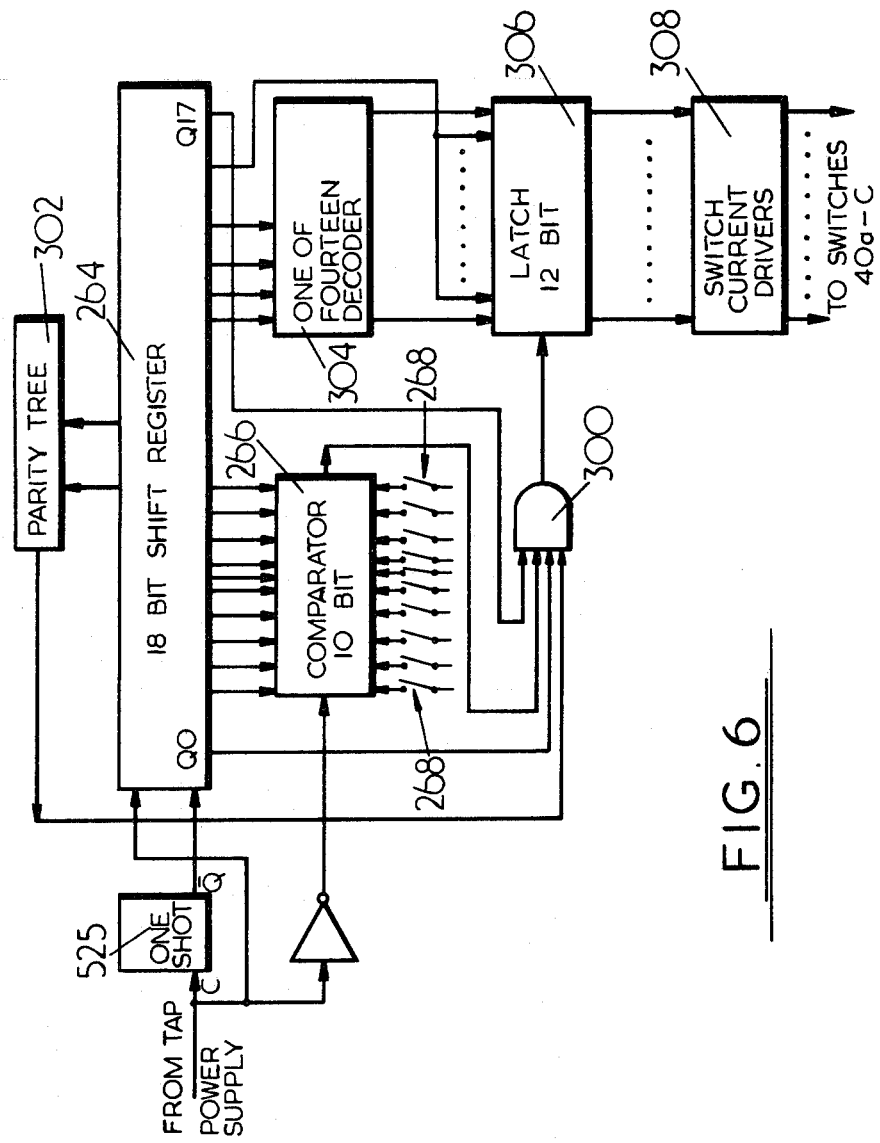
FIG. 6 is a block circuit diagram of tap logic control circuits for receiving and decoding program control data.

Referring to FIG. 6 the tap logic circuit 35 of FIG. 1A decodes the data-coded power received at its data input for operating the tap switches 40 in the basic service module 112 and jamming oscillators 116a, b to control the access of the subscriber to the programs.

In FIG. 6 the coded power pulses are continuously applied to the input of the 18-bit shift register 264. Each positive going edge of the received coded power signal triggers a monostable multivibrator 525, the inverted output of which illustratively is a 6.2 millisecond pulse which is applied to the positive edge triggered clock input of shift register 264 and serves to detect the data on the power and to shift the 18 bits stored in the register one bit position to the right. At the end of a 6.2 ms. pulse triggered by a 120 Hz cycle ("0" bit), the coded power will be negative, and entered into the shift register as a "0". At the end of a 6.2 ms. pulse triggered by a 60 Hz cycle ("1" bit), the coded power will be positive, and entered into the shift register as high or "1". In this way, shift register stores an 18 bit segment of the coded power pulses, that segment changing as each new coded power pulse occurs by dropping the last bit and inserting the new bit.

The third through twelfth bits of the data word stored in the shift register 264 are continuously compared with the ten bit address assigned to the subscriber tap in the comparator 266 by means of switches 268. The output of the comparator 266 is applied to an AND gate 300. Also applied to inputs of the AND gate 300 are the first and last bits of the word stored in the 18 bit shift register (that is the stop and start bits, respectively) and a parity signal from a parity tree 302. The parity tree 302 adds the "1's" in the shift register 264 and puts out a high signal (logical "1") only when the sum is even. The parity of the coded power signal is made even in the power supply logic 108. When the comparator 266 indicates that the subscriber tap address received in the shift register 264 is identical to the tap address assigned to the particular subscriber tap, that the start and stop bits are equal to "1" in the respective first and last positions in the shift register and that parity is even, an enabling signal from the AND circuit enables a one-of-14 decoder circuit 304.

The one-of-14 decoder 304 is supplied with the thirteenth through sixteenth bits from shift register 264 and decodes the four bit control function portion of the 18 bit data word to determine which control function is desired. The one-of-14 decoder 304 enables one bit position of a 12 bit latch circuit 306. The on-off control bit which is the 17th bit of the data word in the shift register 264, is applied to each of the 12 latches in the latch circuit but only the latch selected by the 1-of-14 decoder 304 is actuated in accordance with the on-off control bits. The 1-of-14 decoder also responds to two master codes that will produce logic signals to set all 12 latches to a "1" or reset all 12 to a "0". The outputs of the latching circuit 306 in turn control 12 switch current drivers 308 which are connected to and which control the RF switches 40 a-c.

Thus the 12 RF switches, controlled by the switch current drivers in the latch circuit 306, may control specific channels of programming as well as the respective subscriber's total service for each of four subscribers. For example, one of the RF switches may be a double-pole double-throw switch which in one position opens the circuit between the subscriber's tap transformer 234 and the tap port 49 to which a television receiver converter is connected while in the other position the tap transformer and terminal output are suitably connected for television viewing by the subscriber. Good performance has been achieved using inexpensive PIN diodes to accomplish the switching.

A charged capacitor may be provided as a back-up power source to maintain the states of the switches 40a-c in the event of a brief power failure. If the power failure is of sufficient duration to cause the capacitor to discharge, provision is then desirably made to set all switches 40a-c to provide all services to all subscribers.

There are several possible approaches to deactivating specific channels. In one approach, an LC type of trap with a single-pole single-throw switch across it is employed in a T design. When the switch is closed, the trap is short-circuited and the program for that channel passes. When the switch is open, the trap blocks the program. A more complex approach is a pi type of filter which requires a double-pole double-throw switch. A further approach to single channel deactivation is the use of an oscillator to jam the particular picture carrier. The oscillator may provide a signal at a single frequency, which is for example the carrier frequency, or at a variable frequency, or it may provide narrow band noise as the jamming signal.

An RF switch arrangement 40a-c used in a preferred embodiment of the invention is schematically illustrated in FIG. 7. Each of the RF switches 40a-c has a control input 310 and an RF input 312. To the RF input 312 for each switch 40a there is applied the basic program signal (e.g. all television programs), and for each switch 40b and 40c to its RF signal 312 is applied the jamming oscillator signals. When a low control signal (negative voltage) is applied to the control input 310, i.e., when the control function bit has a logical value of "0", diodes 314, 316 and 318 are forward biased and hence conduct. Diodes 320 and 322 are then back biased and therefore non-conducting. The switch is then "off". Inductors 324, 326, 328, 330 and 332 provide RF isolation. Capacitors 334, 336, and 338 provide DC isolation.

When the control signal applied to input 310 goes high, diodes 314, 316 and 318 are back biased and non-conductive while diodes 320 and 322 become forward biased and hence conductive thereby providing electrical continuiuty between the RF input 312 and the output 340 of each switch 40a-c. The switch is then "ON". The switching current applied to the switches 40a-c by the switch current drivers 308 may be on the order of 1 to 3 milliamperes.

Referring now to FIG. 8 of the drawings, a jamming oscillator 116a,b used in a preferred embodiment of the invention is shown schematically. The jamming oscillator 116a,b has a power input 350 at which there is applied 4.2 volts DC from the DC output of the power supply 120. The AC signal from the secondary winding of the transformer 234 in the power supply 120 is applied to a "wobble" input 352 of the jamming oscillator. Coil 354 and capacitor 356 filter the input power. The input direct voltage biases the base of an oscillator transistors 358 at a nominal level through resistor 374. The base voltage of the oscillator transistor 358 is varied by applying the AC signal to the base of the transistor 358 via the wobble input 352. The collector of transistor 358 is connected to DC power through RF choke 372.

A tank circuit for determining the oscillator frequency includes capacitor 364 in series with the parallel combination of inductor 360 and capacitor 362. In addition, a varactor diode 366 is connected between ground and the base of the transistor 358 forming a part of the tank circuit. The AC power signal from the secondary of the transformer 234 applied to the wobble input 352 is filtered by an RC filter including resistor 368 and capacitor 370. The circuit goes into oscillation at the tank resonant frequency. The output voltage from the collector of the transistor 358 is fed back to the base of the transistor through the intrinsic collector-to-base capacitance. As the voltage across the varactor diode 366 changes so does its capacitance and as this capacitance changes, the resonant frequency of the tank circuit of the oscillator is varied. Hence, the signal at the collector of the transistor 358 has a variable frequency oscillator suitable for jamming the television program carrier signal the frequency of which is within the frequency variation range of the jamming oscillator 116a,b. The output of the jamming oscillator transistor 358 is applied to a band pass filter including capacitors 376, 378, 380 and 382 and inductor 384 to confine the jamming signals to the desired band and prevent interference with other channels.

The following tables 1-3 illustrate some of the various respective combinations of apparatus units which may be included at the head end, power units, and addressable taps of a cable television system according to the invention. The tables are exemplary only and are not intended to disclose all possible combinations of apparatus employable at the head end, power units or taps.

TABLE 1

| HEAD-END CONTROL UNIT COMBINATIONS | | | | | | | | | | | | |
|---|---|---|---|---|---|---|---|---|---|---|---|---|
| Component Units | 1 | 2 | 3 | 4 | 5 | 6 | 7 | 8 | 9 | 10 | 11 | 12 |
| A. Interface Unit | 0 | 0 | 0 | 0 | 0 | 0 | 0 | 0 | 0 | 0 | 0 | 0 |
| B. CPU & Keyboard | 0 | 0 | 0 | 0 | 0 | 0 | 0 | 0 | 0 | 0 | | |
| C. CRT | | 0 | 0 | 0 | 0 | 0 | 0 | 0 | 0 | 0 | | |
| D. Printer | | | | 0 | | | 0 | 0 | 0 | | 0 | | 0 |
| E. Small Tape Store | | | | | 0 | | 0 | | | | | | |
| F. Large Tape Store | | | | | | 0 | | 0 | 0 | | | | |
| G. Real Time Clock | | | | | | | | 0 | | | | | |
| H. Large Main-Frame Interconnect | | | | | | | | | | 0 | 0 | | |
| I. Manual Unit | | | | | | | | | | | | 0 | 0 |

Table 1 illustrates 12 possible combinations of component units which may be used at the head end, in the general system of FIG. 1.

The following is a brief description of the nature of one form of the component units listed in the table.

Interface Unit—A device for converting the entered data to binary form for storage in the parallel/serial register at the head end and for adding stop, start and parity bits.

C.P.U. & Keyboard—A keyboard for entering data into the memory (e.g., register) of a central processor unit (e.g., a modified desk calculator).

CRT—A cathode ray tube device for displaying the entered data.

Printer—A device for typing the entered data on a paper record for subsequent reference.

Small Tape Store—A device for recording the data, as it is entered, on a magnetic tape loaded in a small cassette.

Large Tape Store—A device for recording the entered data on magnetic tape stored on large reels, e.g., as in a reel-to-reel recorder.

Real Time Clock—A timer for causing the data to be transmitted at predetermined times for enabling and disabling specific services of individual subscribers at those times.

Large Main-Frame Interconnect—A device for connecting the head end data transmitting apparatus to a remote computer wherein data is processed, transmitted to the head end and then encoded on the RF carrier signal at the head end for transmission to the power units and subscriber taps.

Manual Unit—A device including manually actuated switches for entering data into the shift register at the head end for encoding on the transmitted RF carrier.

This Table, 1, shows twelve possible combinations of such units, a zero in a numbered column and opposite a vertically listed component unit indicating that that particular component unit is used in combination with other units having "0" in the same column. For example, in combination 3 of Table 1 a keyboard is used for manually entering the power unit address, tap address and control function data into the memory of a central processor unit, whose data may be displayed on a cathode ray tube, typed on a printer, and converted for coding on the RF carrier signal by means of an interface unit.

Table 2 illustrates 8 possible combinations of component units for use in a cable system power unit.

TABLE 2

| POWER UNIT COMBINATIONS | | | | | | | | |
|---|---|---|---|---|---|---|---|---|
| Component Units | 1 | 2 | 3 | 4 | 5 | 6 | 7 | 8 |
| A. Standard Power Unit | 0 | 0 | 0 | 0 | 0 | 0 | 0 | 0 |
| B. 60Hz Keyer | 0 | 0 | | | 0 | | | 0 |
| C. Battery Pack | | | 0 | | 0 | 0 | | |
| D. Data Keyer Unit | | | | 0 | 0 | | 0 | 0 |
| E. Status Transmitter | | | | | | 0 | 0 | 0 | 0 |

These units are:

Standard Power Unit—A saturation transformer for use in cable television systems for regulating the power from the mains.

60 Hertz Keyer—A device having inputs at which positive and negative direct voltages are applied and an output at which there is generated 60 hertz power signals for continuously energizing where the power is uncoded.

Battery Pack—A device employing conventional batteries to provide a supplementary voltage source, usually for backing up the system power supplies in the event of brownouts.

Data Keyer Unit—A device for controlling the system power switch 22 for encoding the power according to the data encoded on the RF carrier transmissions from the head end.

Status Transmitter—A device which can be remotely interrogated from the head end to determine if the power unit or specific circuits therein are functioning properly.

TABLE 3

| SUBSCRIBER TAP COMBINATIONS | | | | | | | | | | | | | | | | |
|---|---|---|---|---|---|---|---|---|---|---|---|---|---|---|---|---|
| Component Units | 1 | 2 | 3 | 4 | 5 | 6 | 7 | 8 | 9 | 10 | 11 | 12 | 13 | 14 | 15 | 16 |
| A. Tap | 0 | 0 | 0 | 0 | 0 | 0 | 0 | 0 | 0 | 0 | 0 | 0 | 0 | 0 | 0 | 0 |
| B. Basic Service Module | | 0 | 0 | 0 | 0 | 0 | 0 | 0 | 0 | 0 | 0 | 0 | 0 | 0 | 0 | |
| C. CH.A Trap | | | 0 | | 0 | 0 | | 0 | | 0 | 0 | | 0 | | | |
| D. CH.B Trap | | | | 0 | 0 | | 0 | | 0 | | | 0 | 0 | | | |
| E. House Feed-Thru | | | | | | | 0 | 0 | | | | | | | | |
| F. CH.A Oscillator | | | | | | | | | 0 | | | | | | | |
| G. CH.B Oscillator | | | | | | | | 0 | | | | | | | | |
| H. Single CH Converter | | | | | | | | | | 0 | | 0 | | | | 0 |
| I. Block Converter | | | | | | | | | | | 0 | | 0 | | 0 | |
| J. Transponder | | | | | | | | | | | | | | 0 | | |
| K. Reverse Path Switch | | | | | | | | | | | | | | | | |
| L. Reverse Path Atten. | | | | | | | | | | | | | | | | |
| M. Section Bypass | | | | | | | | | | | | | | | | |

| Component Units | 17 | 18 | 19 | 20 | 21 | 22 | 23 | 24 | 25 | 26 | 27 | 28 | 29 | 30 |
|---|---|---|---|---|---|---|---|---|---|---|---|---|---|---|
| A. Tap | 0 | 0 | 0 | 0 | 0 | 0 | 0 | 0 | 0 | 0 | 0 | 0 | 0 | 0 |
| B. Basic Service Module | 0 | 0 | 0 | 0 | 0 | 0 | 0 | 0 | 0 | 0 | 0 | 0 | 0 | |
| C. CH.A Trap | | | | | | | | | | | | | | |
| D. CH.B Trap | | | | | | 0 | | | | | | | | |
| E. House Feed-Thru | | | | 0 | | | | 0 | 0 | | | | | |
| F. CH.A Oscillator | | | | | 0 | | 0 | 0 | 0 | | | | | |
| G. CH.B Oscillator | | | | | 0 | 0 | | | 0 | 0 | | | | |
| H. Single CH Converter | | 0 | | | | | | | | 0 | 0 | | | |
| I. Block Converter | | 0 | 0 | | | | | | | | | | | |
| J. Transponder | 0 | | | | | | | | | | 0 | | | |
| K. Reverse Path Switch | | | | | | | | | | | | 0 | | |
| L. Reverse Path Atten. | | | | | | | | | | | | | 0 | |
| M. Section Bypass | | | | | | | | | | | | | | 0 |

Table 3 illustrates 30 possible combinations of component units which may be used in a tap of an addressable subscriber control system according to the invention.

These units are:

Tap—An input device to the addressable subscriber tap for deriving the RF transmissions from the cable.

Basic Service Module—A device for receiving the television program information for all channels at the addressable tap and supplying it through frequency converters to the television receivers of the subscribers.

Channel A Trap—A filtering device for removing from the RF television program signal a band of frequencies associated with one specific channel ("A") to prevent reception of that channel.

Channel B Trap—A device similar to the channel A trap but tuned to filter out a different channel ("B") of television programming.

House Feed-Thru—An optional added device for relaying the coded data received at the subscriber taps to a location within the homes of the respective subscribers for controlling one or more devices within the subscriber's home.

Channel A Oscillator—A device for providing a signal within the frequency band of a particular channel ("A") for jamming that channel thereby preventing its reception by a subscriber.

Channel B Oscillator—A device similar to the channel A oscillator but tuned to a different frequency band for jamming another channel ("B").

Single Channel Converter—A device for receiving one channel of television program information on one frequency or group of frequencies incompatible with a subscriber's television receiver and for converting the television program information to another channel frequency or group of frequencies compatible with the subscriber's television receiver for reception of the channel.

Block Converter—A device for simultaneously receiving signals containing several channels of program information and for providing at respective outputs separate channel signals each of which corresponds to a different channel tunable by a subscriber's television receiver.

Transponder—A device which can be remotely interrogated (e.g., from the head end) for transmitting a signal from the tap to indicate the condition of cable system components at the tap or along the return transmission path.

Reverse Path Switch—A switch for use in a two-way system and operable from a remote location (e.g., at the head end) for selectively enabling or disabling the flow of signals from the tap along a return path toward the head end, as for example in trouble shooting cable faults or by-passing malfunctioning components disposed in the cable path.

Reverse Path Attenuator—A device for selectively attenuating, but not completely blocking, a signal transmitted along the return path from the tap for use in trouble-shooting the cable system.

Section By-Pass—A parallel cable branch providing an alternate path for signals in the event of a malfunction in a portion of the primary cable path.

RF Module—A device for receiving control data coded on an RF signal (as opposed to the coded power transmissions) for controlling subscriber access to the cable system.

The previously disclosed basic service module may be replaced by an RF receiver basic service module for special services and in cases where the system requires a number of terminal points in excess of the 4,096 subscriber control points which are provided for each power unit in the preferred embodiment. The oscillators, traps and converters may have selectable frequencies or frequency bands.

In addition to controlling a subscriber's access to the cable transmission system and for controlling individual selected channels, there are other functions to which the present invention may be applied, which do not relate to subscriber access.

Although the preferred embodiment of the invention has been described for use in a cable television system it is to be understood that the invention has utility in applications other than cable television broadcasting and may be used, for example, in any situation wherein power and signal intelligence are transmitted to a common apparatus. For example, electrical utility companies can use the invention to control the power consumption, using measuring apparatus located at each consumer's residence or facility for billing one type of usage (e.g. heating) at a rate different from the rate for another type of usage (e.g. lighting) by coding the transmitted power and installing at the measuring apparatus a decoder and switches responsive to the decoded data for switching between two types of consumption.

Communication systems such as telephone systems provide another example wherein the invention can be used to provide local control from a central station.

Various control functions at a locality can be controlled from a remote power generating point by coding on the transmitted power enabling signals at the time when a function is to be enabled and disabling signals at a later time when the function is to be disabled. The number of remote functions which can be controlled from a central station is virtually unlimited. Since the transmitted data is serially coded onto the transmitted power the only limit on the number of bits of information which can be used in a coded word is the time period to be allotted to the word.

Another example is in a two-way system where signals are sent from the head end and return signals are received at the head end. Transponders located at remote terminals, equivalent to subscriber taps, may be selectively actuated to test the return path from the remote terminal to the head end. Similarly, remote transponders may send back a signal containing data representing a measure of received signal quality. A further possible use of the present invention may be to actuate selected attenuators of known value distributed along the reverse signal path (that is, the path from the terminal to the head end) for use in trouble-shooting noise or spurious signals on the reverse path. Remote control circuits may also be actuated by similar means in order to provide alternate transmission paths when a main path fails due to a malfunction therein.

While in the example described above, each tap address code may serve up to four subscribers (the particular subscriber of the four being determined by certain bits of the command portion of the data signal), it will be understood that an individual address may be allocated to each subscriber, and the tap device may then respond to any of, say, four subscriber addresses to forward individual command signals for a particular subscriber.

It will also be understood that the present system for encoding and decoding power transmission (which may be regarded as using data signals for power) is not confined to use with the foregoing systems or even addressable taps, but is suitable for use wherever both power and data transmission may be desired, and may also be used for data transmission alone. In addition, the particular encoding and decoding arrangement is not restricted to use of 60 Hz/120 Hz, but other similarly related frequencies may be used.

Thus, while the invention has been described in terms of one application for which it is particularly well suited, i.e. cable television systems where data words are coded on transmitted power, it is not to be confined to such systems but is defined by the following claims.

What is claimed as the invention is:

1. In apparatus for selectively addressing and controlling from a central station one or more power-consuming control devices associated with each of a plurality of power-consuming terminals remote from said central station to achieve one or more desired control functions at each of the remote terminals, wherein said power-consuming terminals are supplied with power from a common power unit, and a transmitter arrangement is adapted to transmit controlling signals from said central station to said power unit, each controlling signal being representative of a desired control function to be effected at one particular remote terminal coupled to said power unit, the combination comprising:

an encoder associated with said power unit for encoding in accordance with said controlling signals the power supplied from said power unit to said remote terminals, a decoder at each remote terminal adapted to receive said encoded power and to derive therefrom power for energizing said decoder and said remote terminal control devices, said decoder also being adapted to derive from said encoded power the particular signal representative of the desired control function for the respective terminal, at least one of said control devices at said terminal being responsive only to said derived signal for performing said desired control function, wherein said central station is a program source for a wired broadcast system having a cable system and said power-consuming devices are supplied by said power unit over said cable system, and said terminals are included in tap devices for supplying one or more subscriber stations with said programs, and said transmitter arrangement also transmits program signals from said central station to said subscriber stations via said power unit and under the control of said control devices.

2. Apparatus as claim 1 wherein said desired control functions include any one of:

connecting or disconnecting a subscriber station to or from its respective terminal, permitting or inhibiting transmission of a particular program to a subscriber station, jamming transmission of one or more programs to a subscriber station.

3. In apparatus for selectively addressing and controlling from a central station one or more power-consuming control devices associated with each of a plurality of power-consuming terminals remote from said central station to achieve one or more desired control functions at each of the remote terminals, wherein said power-consuming terminals are supplied with power from a common power unit, and a transmitter arrangement is adapted to transmit controlling signals from said central station to said power unit, each controlling signal being representative of a desired control function to be effected at one particular remote terminal coupled to said power unit, the combination comprising:

an encoder associated with said power unit for encoding in accordance with said controlling signals the power supplied from said power unit to said remote terminals, a decoder at each remote terminal adapted to receive said encoded power and to derive therefrom power for energizing said decoder and said remote terminal control devices, said decoder also being adapted to derive from said encoded power the particular signal representative of the desired control function for the respective terminal, at least one of said control devices at said terminal being responsive only to said derived signal for performing said desired control function, said apparatus including a plurality of such power units, and wherein said remote terminals are subdivided into groups, each group receiving power from a respective one of said power units and wherein said transmitted signals are data signal words, each data word having an address portion representative of the location of a respective remote terminal and a command portion representative of the desired control function to be effected at that remote terminal, each said data word also includes a power-unit address portion; and each said power unit includes a power unit decoder responsive only to data words containing the address portion representative of its own power unit for enabling functioning of its power unit encoder only in response to reception of its respective data word address portion wherein said terminal decoder is responsive only to data words having the address portion representative of its respective terminal for actuating said control devices, said said control devices are responsive to only the data word command portion associated with said representative address portion, and wherein said central station is a program source for a wired broadcast system, having a cable system and said power-consuming devices are supplied by said power units over said cable system, and said terminals are included in tap devices for supplying one or more subscriber stations with said programs, and said transmitter arrangement also transmits program signals from said central station to said subscriber stations via said power units and under the control of said terminal control devices.

4. In apparatus for selectively addressing and controlling from a central station one or more power-consuming control devices associated with each of a plurality of power-consuming terminals remote from said central station to achieve one or more desired control functions at each of the remote terminals, wherein said power-consuming terminals are supplied with power from a common alternating-current power unit, and a transmitter arrangement is adapted to transmit controlling signals from said central station to said power unit, each controlled signal being representative of a desired control function to be effected at one particular remote terminal coupled to said power unit, the combination comprising:

an encoder associated with said power unit for encoding in accordance with said controlling signals the power supplied from said power unit to said remote terminals, a decoder at each remote terminal adapted to receive said encoded power and to derive therefrom power for energizing said decoder and said remote terminal control devices, said decoder also being adapted to derive from said encoded power the particular controlling signal representative of the desired control function for the respective terminal, at least one of said control devices at said terminal being responsive only to said derived signal for performing said desired control function, wherein said encoder causes said power to shift between a first power frequency and a second power frequency in accordance with said transmitted signals, said signals are in the form of binary data, and said encoder produces for each binary "1" a single power cycle of said first power frequency and for each binary "0" a single power cycle of said second power frequency and of the same polarity, said encoder also producing full cycles of power of said first frequency in the absence of any binary data, said remote terminal decoder includes a circuit responsive to a cycle of said encoder power having a first duration for producing a first decoded signal and a cycle of a second duration for producing a second decoded signal, said control devices being responsive to said first and second decoded signals.

5. Apparatus as in claim 4 wherein said encoder includes a direct voltage source, a switching circuit for switching the output of said voltage source from either polarity to the other polarity to produce an alternating power source, and a circuit associated with said switching circuit and initiating each of said single cycles in the same polarity in response to said transmitted signals.

6. An addressable tap device for use in a wired broadcast cable system for disseminating program materials from a central station to subscribers at any of a plurality of remote terminals included in said tap device and adapted to be coupled to respective controlled devices to achieve any of a plurality of desired control functions at each controlled device, said system including power-cunsuming units at differing locations along said cable system and at least one power-supply unit for supplying power to said power-consuming units, said supplied power from each power-supply unit being encoded in accordance with data signals each representative of a particular controlled device and of a particular set of desired control functions for the controlled device, said tap device being adapted to be coupled to said cable system at a desired location interposed between said central station and one or more of said controlled devices and also being adapted to be energized by said supplied power;

said tap device comprising:

a decoder responsive to said coded supplied power for deriving power to energize said tap device and for deriving signals representative of desired control functions to be provided at the respective tap device, and one or more further control devices responsive to said derived control function signals for determining the functions obtainable at one or more of said terminals included in the tap device, said system further including means for transmitting said program materials to said taup device independently of transmission of said coded power, and said further control devices including switching devices for controlling access by said subscribers to said program materials.

7. An addressable tap device as in claim 6 for a system wherein said data signals encoded on said supplied power include a tap-address portion unique to each tap device and a command-signal portion for each subscriber, and said decoder is responsive only to data signals having a tap-address portion representative of the respective tap device.

8. An addressable tap device as in claim 6 wherein:
said control devices are adapted selectively (a) to connect or disconnect a subscriber as to all program materials, (b) to connect or disconnect a subscriber as to predetermined program materials only, or (c) to jam reception by the subscriber of predetermined program materials.

9. A cable system comprising:

a power cable;

a plurality of subscriber devices;

a source of a plurality of command signals;

a plurality of addressable tap devices coupled to said cable and each assigned an individual address, each tap device being adapted to be coupled to a group of one or more subscriber devices;

a controlling device included in each tap device and adapted to cause each coupled subscriber device to assume at least one functional condition in response to a respective predetermined command signal;

a power supply unit coupled to said cable and adapted to supply power for energizing said tap devices and their controlling devices, said power supply unit being adapted to provide alternating power with individual cycles of either of two fixed durations, in predetermined sequences of said cycles, certain of said sequences being representative of the addresses of individual tap devices and also being representative of particular command signals for determining the functional condition of said subscriber devices;

a decoder included in each said tap device and responsive to those of such sequences of power cycles which are representative of the address of said tap device and also representative of a command signal for a particular subscriber device coupled to said tap device, for causing said latter subscriber device to assume a functional condition corresponding to said command signal.

10. A cable system as in claim 9 for television programs, said system further including means for superimposing television program signals on said alternating power for transmission to said tap devices and thereby to said particular subscriber device in response to at least an appropriate one of said cycle combinations representative of said address and command signal.

11. A cable system as in claim 9 wherein said functional condition is at least one of:

(a) the state of operative connection between said subscriber device and said cable, including the connection and disconnection of said subscriber device to and from said cable;

(b) the state of transmission of particular programs to said subscriber device, including permitting and inhibiting said transmission;

(c) jamming of transmission of one or more programs to said subscriber device.

12. In a cable system in which supplied power is encoded by causing each full cycle of said encoded power to have one of several durations in accordance with signals representing the addresses and desired commands for a plurality of controlled devices, the invention comprising an addressable tap device adapted to be coupled to at least one of said controlled devices, said tap device including:

(a) a controlling device energized by said encoded power and responsive to said desired command signals to place at least one of said controlled devices in any of at least one functional condition corresponding to said commands; and (b) a decoder energized by said encoded power and responsive only to encoded signals representing an address individual to said tap device, for supplying to said controlling devices signals representative of said command.

13. In a program-transmitting cable system having a cable, a plurality of power units coupled to said cable, a plurality of addressable tap devices also coupled to said cable, and at least one individual device adapted to be controlled by each tap device, the method comprising:

(a) encoding the power supplied by each said power unit with encoding signals each representing the address of an individual tap device, each encoding signal also representing a desired condition of at least one of said individual devices to be controlled by said individual tap device;

(b) receiving said encoded power at each tap device;

(c) causing said encoded power to energize said tap device;

(d) causing only that tap device having an address corresponding to the address portion of a particular encoded power signal to respond to that signal;

(e) causing the tap device thus responsive to the encoded signal to respond to the condition-representing portion of the encoded power signal having said latter address portion, to produce the desired corresponding condition of said controlled device.

14. In a subscriber cable television system for selectively addressing and controlling from a central station any of a plurality of subscriber devices to achieve any of a plurality of desired control functions at each subscriber device, said cable system including power-consuming units at different locations along said cable system and a power-supply unit for supplying power to said power-consuming unit, said supply power from said power-supply unit being encoded in accordance with data signals each representative of a particular group containing at least one of said subscriber devices and of a particular set of desired control functions for one of said group of subscriber devices, by causing each full cycle of said encoded power to have one of a plurality of durations in accordance with said data signals, the invention comprising a tap device adapted to be coupled to said cable system at a desired location between said central station and said group of subscriber devices, said tap device being also adapted to be energized by said supplied power, said tap device comprising:

a decoder responsive to said encoded supplied power for deriving therefrom power to energize said tap device and also for deriving signals from said encoded power representative of at least one desired control function to be provided for said group of subscriber devices coupled to said tap device, and at least one controlling device responsive to said derived control-function signals for determining the control functions to be performed on a selected one of said group of subscriber devices.

15. An apparatus for selectively addressing and controlling in accordance with coding signals one or more power-consuming control devices associated with each of a plurality of remote power-consuming terminals to achieve one or more desired control functions at each of the remote terminals, wherein said power-consuming terminals are supplied with power from a common alternating-current power unit, each coding signal being representative of a desired control function to be effected at one particular remote terminal coupled to said power unit, said apparatus comprising (a) an encoder associated with said power unit for causing individual cycles of said power to have either a first or a second duration in accordance with said coding signals, the encoded power being supplied to each remote terminal, and (b) a decoder provided at each remote terminal receiving said encoded power and deriving therefrom power for energizing said decoder and said remote terminal control devices, said decoder also deriving from said encoded power the particular signal representative of the desired control function for the respective terminal and said control devices at said terminal being responsive only to said particular signal for performing said desired control functions.

16. An apparatus according to claim 15, wherein said coding signals are in the form of data words, each data word having an address portion representative of the location of a respective remote terminal and a command portion representative of the desired control function to be effected at that remote terminal, said decoder is responsive only to data words having the address portion representative of its respective terminal for actuating said control devices, and said control devices are responsive to only the data word command portion associated with said representative address portion.

17. An apparatus according to claim 16 including a plurality of power units, wherein said remote terminals are subdivided into groups, each group receiving power from a respective one of said power units, and each said data word also includes a power-unit address portion and each said power unit includes a power unit decoder responsive only to data words containing the address portion representative of its own power unit for enabling functioning of its power unit encoder only in response to reception of its respective data word address portion.

18. An apparatus according to claim 15, wherein said control devices are controlled from a central station, and wherein said central station is a program source for a wired broadcast system, having a cable system and power-consuming devices supplied by said power unit over said cable system, and said terminals are included in taps for supplying one or more subscriber stations with said programs, and program signals are transmitted from said central station to said subscribers via said power unit and under the control of said terminal control devices.

19. An apparatus according to claim 18, wherein said desired control functions include connecting or disconnecting a subscriber station from its respective terminal, and/or permitting or inhibiting transmission of a particular program to a subscriber, and/or jamming transmission of one or more programs to a subscriber.

20. An apparatus according to claim 18 including a transmitter arrangement comprising a source of pilot radio frequency and a modulator for producing said coding signals in the form of pulses of said pilot frequency of varying duration.

21. An apparatus according to claim 18, wherein said central station is a program source for a wired broadcasting system for disseminating programs to subscribers at said remote terminals and wherein said remote terminals are included in addressable taps each for supplying one or more subscriber stations with said programs, said system further including means for transmitting said programs to said taps independently of transmission of said coded power, said control devices including switching devices for controlling access by said subscribers to said programs.

22. An apparatus according to claim 15, wherein said coding signals are in the form of binary data, and said encoder produces for each binary "1" a single power cycle of said first duration and for each binary "0" a single power cycle of said second duration and of the same polarity, said encoder also producing full cycles of power of said first duration in the absence of any binary data.

23. An apparatus according to claim 22, wherein said encoder includes a direct voltage source, a switching circuit for switching the output of said voltage source from either polarity to the other to produce an alternating power source, and a circuit initiating each of said single cycles in response to said coding signals with a switching operation to the same polarity, to cause all said single cycles to be of the same polarity.

24. An apparatus according to claim 22, wherein said single full cycles are sequential and said decoder comprises a monostable circuit responsive to the leading edge of each cycle for producing an output pulse of a predetermined duration, and a shift register supplied with said cycles produced by said encoder and shifted by said output pulse, whereby the data stored in said register represents said binary zeros and ones.

25. An apparatus according to claim 15, wherein said remote terminal decoder includes a circuit responsive to a cycle of said encoded power having said first duration for producing a first decoded signal element and a cycle of said second duration for producing a second decoded signal element, said control devices being responsive to said first and second decoded signal elements.

26. A power-consuming addressable tap device for use in a wired broadcast system having a program source at a central station, a cable system for distributing said program, and at least one alternating-current power-supplying unit along said cable system, wherein said power unit provides encoded power-containing coding signals representative of a desired control function to be effected at a particular remote terminal to be coupled to said cable system, said coding signals being also representative of the address of the particular remote terminal, said power unit providing a succession of full cycles of power, each cycle having either a first duration or a second duration to constitute said coding signals, said addressable tap device having its power requirements supplied by said encoded power, and comprising
(a) a decoder receiving said encoded power and deriving therefrom power for energizing said tap device,
(b) said decoder also deriving from the encoded power signals representative of the said control function for the particular terminal, and
(c) a control device responsive to said derived signal for effecting the said desired function at the particular remote terminal.

27. An addressable tap device as in claim 26, wherein said derived signals are in the form of binary data, and said decoder includes a circuit responsive to a full cycle of said encoded power having a first duration for producing a first type of binary bit (e.g., "0"), and responsive to a full cycle of said encoded power having a second duration for producing a second type of binary bit (e.g., "1"), and said control device is responsive to said first and second bit types.

28. An addressable tap device as in claim 27, wherein said decoder comprises a circuit responsive to the leading edge of each power cycle for producing an output pulse.

* * * * *